United States Patent
Gamsa et al.

(10) Patent No.: US 9,529,952 B1
(45) Date of Patent: Dec. 27, 2016

(54) SPECULATIVE CIRCUIT DESIGN COMPONENT GRAPHICAL USER INTERFACE

(71) Applicant: ALTERA CORPORATION, San Jose, CA (US)

(72) Inventors: Benjamin Michael Joshua Gamsa, Toronto (CA); Gordon Raymond Chiu, North York (CA)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 14/704,721

(22) Filed: May 5, 2015

(51) Int. Cl.
*G06F 17/50* (2006.01)

(52) U.S. Cl.
CPC ......... *G06F 17/505* (2013.01); *G06F 17/5054* (2013.01)

(58) Field of Classification Search
CPC ..................................................... G06F 17/50
USPC ........................................................ 716/132
See application file for complete search history.

(56) References Cited

U.S. PATENT DOCUMENTS

2013/0104092 A1* 4/2013 Buck ................... G06F 17/5031
716/113

OTHER PUBLICATIONS

U.S. Appl. No. 14/295,752, filed Jun. 4, 2014, Gordon Raymond Chiu.

* cited by examiner

*Primary Examiner* — Thuan Do
(74) *Attorney, Agent, or Firm* — Fletcher Yoder, P.C.

(57) ABSTRACT

In one embodiment, a tangible, non-transitory, computer-readable medium, includes instructions to receive a first circuit design, determine one or more variations of the first circuit design using register retiming with speculative circuit design changes, determine one or more performance improvements of the variations when fed clock signals over the first circuit design, determine one or more tradeoffs of the one or more variations of the first circuit design in comparison to the first circuit design, display a summary of the one or more variations of the first circuit design, the one or more performance improvements, and the one or more tradeoffs, and provide a user-selectable user interface element to enable selection of the first circuit design, at least one of the one or more variations of the first circuit design, or a combination thereof.

19 Claims, 18 Drawing Sheets

| Clock Name | Fmax | Achieved with Hyper-Retiming | Achieved with Hyper-Pipelining | Achieved with Hyper-Optimization | Restricted Fmax |
|---|---|---|---|---|---|
| 1 clk_r | 172.83 MHz | 222.57 MHz | 222.57 MHz | See report for recommendations | 222.57 MHz |
| 2 clk_w | 255.04 MHz | 416.32 MHz | 541.71 MHz | See report for recommendations | 541.71 MHz |

FIG. 4

| Fast Forward Details for Clock Domain clk_w | | | | | |
|---|---|---|---|---|---|
| | Step | Fast Forward Optimizations Applied | To Achieve Fmax | Slack | Requirement | Limiting Reason |
| 1 | Base Performance | 0, including 0 pipeline stages | 255.04 MHz | -3.017 | 0.874 | Insufficient Registers |
| 2 | Fast Forward Step #1 | 381, including 0 pipeline stages | 416.32 MHz | -1.498 | 0.874 | Insufficient Registers |
| 3 | Fast Forward Step #2 | 439, including 1 pipeline stage | 531.91 MHz | -0.976 | 0.874 | Insufficient Registers |
| 4 | Fast Forward Step #3 | 439, including 2 pipeline stages | 538.79 MHz | -0.953 | 0.874 | Insufficient Registers |
| 5 | Fast Forward Step #4 | 440, including 3 pipeline stages | 541.71 MHz | -0.942 | 0.874 | Insufficient Registers |
| 6 | Hyper-Optimization | 440, including 3 pipeline stages | | | | |

| | Path Info | Register | jpm | Element |
|---|---|---|---|---|
| 54 | Long Path (Critical) | empty slot | | if_in:i0|gen_busw:i0|din_01[7]~R32_X78_Y28_N0_I45 |
| 55 | Long Path (Critical) | empty slot | | if_in:i0|gen_busw:i0|din_01[7]~R32_X57_Y28_N0_I0 |
| 56 | Long Path (Critical) | | | if_in:i0|gen_busw:i0|din_01[7]~LAB_RE_X85_Y28_N0_I1 |
| 57 | Long Path (Critical) | REG | #2 | if_in:i0|gen_busw:i0|din_01[7]~C27_X56_Y4_N0_I24_diff |
| 58 | | empty slot | #3 | i0|i0|din_01[7]|q |
| 59 | Retiming Dependency | empty slot | * | if_in:i0|gen_busw:i0|din_01[7]~ia_lab/labout[1] |
| 60 | Retiming Dependency | empty slot | * | if_in:i0|gen_busw:i0|din_01[7]~LAB_RE_X85_Y28_N0_I11 |
| 61 | Retiming Dependency | empty slot | * | if_in:i0|gen_busw:i0|din_01[7]~R3_X82_Y28_N0_I23 |
| 62 | Retiming Dependency | empty slot | * | if_in:i0|gen_busw:i0|din_01[7]~R3_INTERCONNECT_DRIVER_X81_Y28_N0_I6 |
| 63 | Retiming Dependency | empty slot | * | if_in:i0|gen_busw:i0|din_01[7]~R32_X82_Y28_N0_I0 |
| 64 | Retiming Dependency | empty slot | * | if_in:i0|gen_busw:i0|din_01[7]~R32_X78_Y28_N0_I6 |
| 65 | Retiming Dependency | empty slot | * | if_in:i0|gen_busw:i0|din_01[7]~R3_INTERCONNECT_DRIVER_X88_Y28_N0_I1 |
| 66 | Retiming Dependency | empty slot | * | if_in:i0|gen_busw:i0|din_01[7]~R32_X57_Y28_N0_I0 |
| 67 | Retiming Dependency | empty slot | * | if_in:i0|gen_busw:i0|din_01[7]~R32_X78_Y28_N0_I45 |
| 68 | Retiming Dependency | empty slot | * | if_in:i0|gen_busw:i0|din_01[7]~R3_INTERCONNECT_DRIVER_X56_Y28_N0_I1 |
| 69 | Retiming Dependency | REG | #2 | if_in:i0|gen_busw:i0|din_01[7]~C27_X56_Y4_N0_I24_diff |
| 70 | | | #3 | i0|i0|din_01[7]|q |
| 71 | | empty slot | * | if_in:i0|gen_busw:i0|din_01[7]~LAB_RE_X85_Y28_N0_I11 |
| 72 | Long Path | | | |
| 73 | Long Path | | | if_in:i0|gen_busw:i0|din_01[7]~R3_X82_Y28_N0_I23 |
| 74 | Long Path | | | |
| 75 | Long Path | | | |

Critical Chain and Recommendations to Achieve Fast Forward
Fast Forward Optimizations Applied in Clock Domain clk_s | Critical Chain at Limit | Recommendations for Critical Chain
Fast Forward Step 1 (416.32 MHz)

Critical Chain and Recommendations to Achieve Fast Forward Step 7 (416.32 MHz)

| | Fast Forward Optimizations Applied in Clock Domain 'clk_w' | Critical Chain at Limit | Recommendations for Critical Chain |
|---|---|---|---|

Fast Forward Optimizations

1. ⊖ Removed asynchronous clears on 381 Registers (1 Domain)
  1. ⊖ Removed asynchronous clears on 381 Registers in Clock Domain 'clk_w' (7 Entities)
    1. ⊖ Removed asynchronous clears on 76 Registers in Entity gen_busw (1 Instance)
      1. ⊖ Removed asynchronous clears on 76 Registers in instance |alcatel_space|if_in:i0|gen_busw:i0 (12 signals)
        1. Removed asynchronous clears on bus if_in:i0|gen_busw:i0|adr_w01 (12 signals)
          1. Removed asynchronous clears on if_in:i0|gen_busw:i0|adr_w01[0]
          2. Removed asynchronous clears on if_in:i0|gen_busw:i0|adr_w01[6]
          3. Removed asynchronous clears on if_in:i0|gen_busw:i0|adr_w01[1]
          4. Removed asynchronous clears on if_in:i0|gen_busw:i0|adr_w01[7]
          5. Removed asynchronous clears on if_in:i0|gen_busw:i0|adr_w01[2]
          6. Removed asynchronous clears on if_in:i0|gen_busw:i0|adr_w01[8]
          7. Removed asynchronous clears on if_in:i0|gen_busw:i0|adr_w01[3]
          8. Removed asynchronous clears on if_in:i0|gen_busw:i0|adr_w01[9]
          9. Removed asynchronous clears on if_in:i0|gen_busw:i0|adr_w01[4]
          10. Removed asynchronous clears on if_in:i0|gen_busw:i0|adr_w01[10]
          11. Removed asynchronous clears on if_in:i0|gen_busw:i0|adr_w01[5]
          12. Removed asynchronous clears on if_in:i0|gen_busw:i0|adr_w01[11]
        2. ⊖ Removed asynchronous clears on bus if_in:i0|gen_busw:i0|din_01 (24 signals)
          1. Removed asynchronous clears on if_in:i0|gen_busw:i0|din_01[17]
          2. Removed asynchronous clears on if_in:i0|gen_busw:i0|din_01[22]
          3. Removed asynchronous clears on if_in:i0|gen_busw:i0|din_01[16]
          4. Removed asynchronous clears on if_in:i0|gen_busw:i0|din_01[16]

FIG. 16

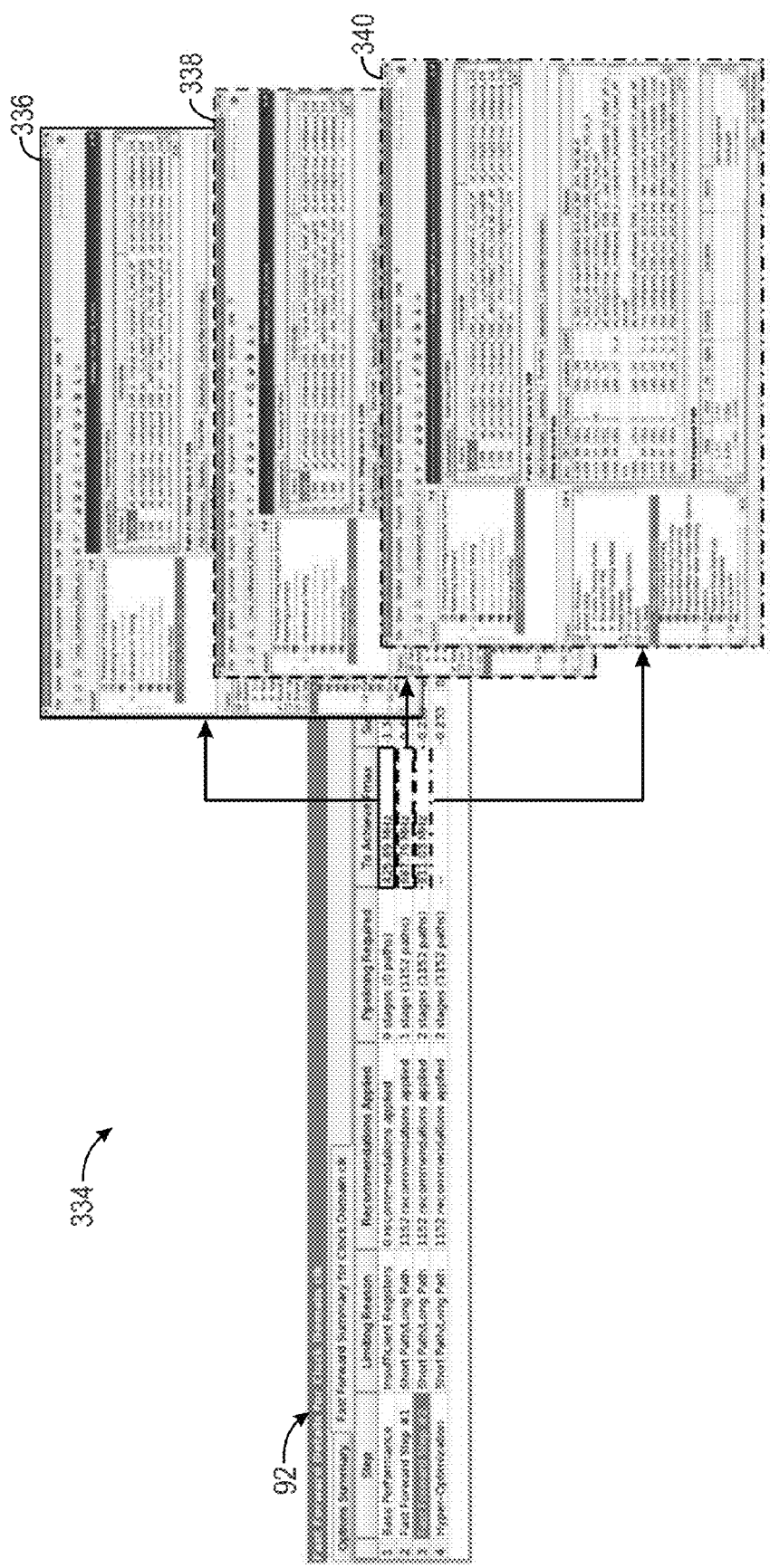

SPECULATIVE CIRCUIT DESIGN COMPONENT GRAPHICAL USER INTERFACE

BACKGROUND

The present disclosure relates generally to integrated circuits (ICs), which may include programmable logic devices (PLDs) such as field programmable gate arrays (FPGAs). More particularly, the present disclosure relates to determining, displaying, and/or controlling variations to a circuit design for an integrated circuit.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Integrated circuits (ICs) take a variety of forms. For instance, programmable logic devices (PLDs) such as field programmable gate arrays (FPGAs) are ICs that may be highly flexible devices. FPGAs may include logic that may be programmed after manufacturing to provide functionality that the FPGA may be designed to support. Thus, FPGAs contain programmable logic, or logic blocks, that may perform a variety of functions on the FPGAs, according to a user's circuit design. Different components of a circuit design may use different respective clock signals produced by a clock generator to perform programmed functions. The frequency of each clock signal—also referred to in this disclosure as "performance," since the frequency of each clock signal affects how quickly the circuitry that uses that clock signal may operate—may be limited by the design of the circuitry.

One technique to improve the performance of the circuit design is the use of register retiming, which moves registers back and forth across combinational logic to improve the maximum achievable clock signal frequency. However, the benefits of retiming are often limited due to the use of certain constructs in circuit designs that inadvertently inhibit retiming. Such restrictions might include user directives intended for other purposes but that also limit retiming, the use of certain hardware features, such as asynchronous clears, that might be incompatible with retiming on some architectures, or even simply the lack of sufficient available registers for retiming. Some computer aided design (CAD) tools are being developed that can remove these restrictions or add registers to demonstrate the performance potential of retiming with changes to the user's circuit design. Such changes, however, may entail tradeoffs between performance and other potentially detrimental circuit-design changes. The circuit designer may not be aware of the multitude of variations available and/or the tradeoffs that may be associated with those variations.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Present embodiments relate to software programs, methods, and devices for determining, displaying, and/or controlling variations to a first circuit design implemented by an integrated circuit based on certain tradeoffs, such as between a desired clock signal performance and an amount of circuit design changes required to implement the variation that produces the desired clock signal performance. In particular, the present embodiments may include determining one or more variations to the first circuit design by making speculative circuit design changes including adding registers (pipelining), removing user directives, removing asynchronous clears, converting asynchronous clears with synchronous clears, and so forth. The variations being fed the clock signals may be retimed using a retimer to determine the clock signal performance achieved by each variation. The embodiments may provide a graphical user interface (GUI) that displays the speculative circuit design changes performed for each variation of the first circuit design and the respective clock signal performance produced by each variation. Further, the user may control which speculative circuit design changes are allowable using the GUI when subsequently determining variations of the first circuit design during retiming, among many other things. Using the disclosed techniques, a user may more easily understand what speculative circuit design changes have been performed and what speculative circuit design changes are required to achieve a desired clock signal performance.

Various refinements of the features noted above may be employed in relation to various aspects of the present disclosure. Further features may also be incorporated in these various aspects as well. These refinements and additional features may be employed individually or in any combination. For instance, various features discussed below in relation to one or more of the illustrated embodiments may be incorporated into any of the above-described aspects of the present invention alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 4 illustrates a GUI screenshot of the performance summary displayed by the process of FIG. 3, in accordance with an embodiment;

FIG. 6 illustrates a GUI screenshot of the details of FIG. 5, in accordance with an embodiment;

FIG. 9 illustrates a GUI screenshot of the critical chain of FIG. 8, in accordance with an embodiment;

FIG. 16 illustrates a GUI screenshot of the list of FIG. 15, in accordance with an embodiment;

FIG. 25 illustrates a GUI screen of the netlists including timing delay data of the data paths in selected circuit designs determined by the process of FIG. 24, in accordance with an embodiment.

DETAILED DESCRIPTION OF SPECIFIC EMBODIMENTS

Figure 1:
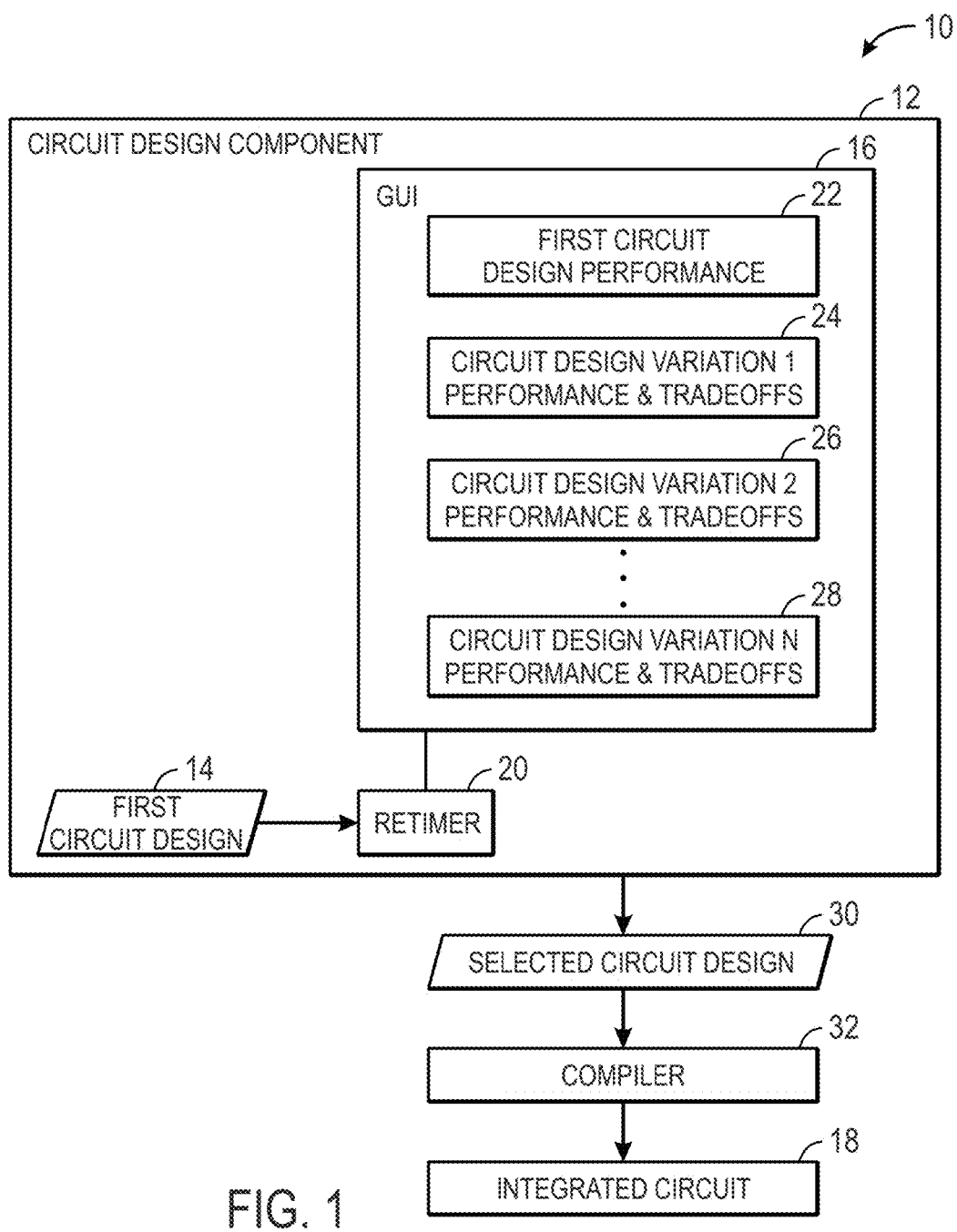
FIG. 1 illustrates a block diagram of a system that utilizes a circuit design component that determines variations of a first circuit design and uses a graphical user interface (GUI) to display and allow selection of the variations based on improved performance and tradeoffs to program an integrated circuit, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As discussed in further detail below, embodiments of the present disclosure relate generally to circuitry and/or processor-executable, machine-readable instructions stored on a tangible, non-transitory, machine-readable medium for enabling determining, displaying, and/or controlling variations to a circuit design implemented by the integrated circuits (ICs) based on certain tradeoffs, such as between improved performance of variations being fed one or more clock signals and an amount of circuit design changes required to implement the variations that produce the improved clock signal performance. In some embodiments, a graphical user interface (GUI) is used to display variations of a first circuit design including different levels of speculative circuit design changes determined by a retimer that may be made to achieve different levels of performance for numerous clock signals. The retimer may retime the performance of the variations of the circuit design when fed the clock signals after the variations are fit or compiled, as described by U.S. Ser. No. 14/295,752, which is incorporated by reference herein in its entirety for all purposes. It should be appreciated that the embodiments of the disclosure may be implemented as instructions executed in a processor and/or hardware logic (e.g., an application-specific integrated circuit (ASIC) or a programmable logic device (PLD) such as a field programmable gate array (FPGA)).

It should be understood that the term "speculative circuit design changes" in this context may refer to generating machine-readable instructions implementing circuit design changes internally in a circuit design component (e.g., computer aided design (CAD) optimization tool) independent of a user's actual source code. Thus, the retimer analyzes the variations including the speculative circuit design changes to provide estimates of the performance of the variation being fed the clock signals. As may be understood, retiming may refer to a technique that enables the clock signal to run faster while still preserving correctness of the circuit design. By providing these machine-readable instructions independent of the source code, a user (e.g., circuit designer) is better able to explore the benefits of these speculative circuit design changes without having to modify their code. However, the speculative circuit design changes made in a variation of the circuit design may be output in a program file to facilitate programming an integrated circuit or implemented in the actual source code if selected by the user. As such, a user selectable element may be provided by the GUI to enable selection of the first circuit design, at least one of the variations, or some combination thereof. Additionally or alternatively, the selected circuit design may be output (generated program file) to facilitate programming of an integrated circuit.

In some instances, the number of speculative circuit design changes may be in the tens of thousands when multiple clock signals are used. Although the full set of speculative circuit design changes may be required to achieve the maximum performance of the clock signals, in many cases far fewer circuit design changes are required to achieve the user's desired clock signal performance. Thus, the GUI enables a user to visualize the amount of speculative circuit design changes required to achieve the desired level of clock signal performance. Also, the GUI may display reasons why the performance of the respective variations being fed the clock signal was limited bn. In some embodiments, the GUI enables controlling the compilation and types of speculative circuit design changes made to the first circuit design by remembering whether the user selects to accept or reject certain recommended circuit design changes. Further, the GUI may enable a user to select a variation of the first circuit design to implement on an integrated circuit (IC).

As may be appreciated, the GUI may enable a user to better understand what speculative design changes were performed by the retimer and what changes are required to achieve a desired level of clock signal performance. This may be beneficial early in the development lifecycle of a circuit design by determining what the performance estimates are of a particular circuit design. Also, the techniques may be beneficial in a late design stage where the user has made some circuit design changes but is looking to get a last desired performance improvement (e.g., a 10% performance improvement), for example, and the techniques will provide guidance on the circuit design changes to make to achieve the desired performance improvement.

With the foregoing in mind, FIG. 1 illustrates a block diagram of a system 10 that utilizes a circuit design component 12 to determine variations of a first circuit design 14 and uses a graphical user interface (GUI) 16 to display and allow selection of the variations based on improved performance and tradeoffs to program an integrated circuit (IC) 18, in accordance with an embodiment. The circuit design component 12 may represent a CAD optimization tool. The circuit design component 12 may include the first circuit design 14, the GUI 16, and a retimer 20. The first circuit design 14 may represent the user's original circuit design source code written in a low-level programming language. The retimer 20 may accept the first circuit design 14 as input and determine variations including speculative circuit design changes to the first circuit design 14. The retimer 20 may also retime the performance of the first circuit design 14 and the variations (e.g., by allowing certain circuitry of the circuit design to be fed by a higher frequency clock signal).

In some embodiments, the speculative circuit design changes made in the variations of the first circuit design 14 may be made in an attempt to maximize the performance of the clock signals feeding the first circuit design 14. It should be understood that performance of the clock signals refers to the frequency of the clock signals, since the frequency of a clock signal that drives some circuitry of the circuit design 14 may be limited by the design of the circuitry driven by that clock signal. The speculative circuit design changes made in the variations of the first circuit design 14 to enhance performance of the variations being fed the clock signals may include removing asynchronous clears, converting asynchronous clears to synchronous clears, removing user directives, adding pipelining (adding registers on either side of an asynchronous clock transfer), and the like. It should be noted, that in many cases there may be multiple options for improving the performance and there may be tradeoffs between a desired level of performance with an amount of effort required to achieve the desired level of performance. For example, not all of the speculative circuit design changes may be required (less effort) to achieve a sufficient level of clock signal performance.

The GUI 16 may facilitate displaying the options to the user including the performances of the variations and the tradeoffs, as noted above. As illustrated, the GUI 16 may display a first circuit design performance 22, a circuit design variation 1 performance and tradeoffs 24, a circuit design variation 2 performance and tradeoffs 26, and a circuit design variation N performance and tradeoffs 28. As described below, the information displayed by the GUI 16 may be altered and presented in any suitable format. For example, the GUI 16 may present the information in a summary of the achievable performance by each clock signal domain (e.g., write, read, set host) and type of variation used to achieve that performance. Further, the user can drill down into the details of each clock signal domain to compare the first circuit design performance with the variations' performance and the level of effort required (e.g., number and type of speculative circuit design changes) to achieve their performance.

Further, the GUI 16 may enable a user to select a particular circuit design 30 to be compiled by a compiler 32 and implemented by the IC 18. For example, the IC 18 may receive one or more kernel programs which describe the hardware implementations that should be stored in the IC 18. In addition, the GUI 16 may provide a facility to allow the user to guide the compiler 32 and retimer 20 by indicating which speculative circuit design changes the user either intends to make or intends not to make (e.g., intends never to make). The compiler 32 can optimize based on the speculative circuit design changes the user intends to make, and the retimer 20 may avoid speculating circuit design changes that the user has indicated they will never make when subsequently retiming. Using the GUI 16, the user may also be able to specify the nature of speculation performed by the retimer 20, such as how many registers may be added, which user directives may be removed, whether asynchronous clears can be removed or converted to synchronous clears, and so forth.

Figure 2:
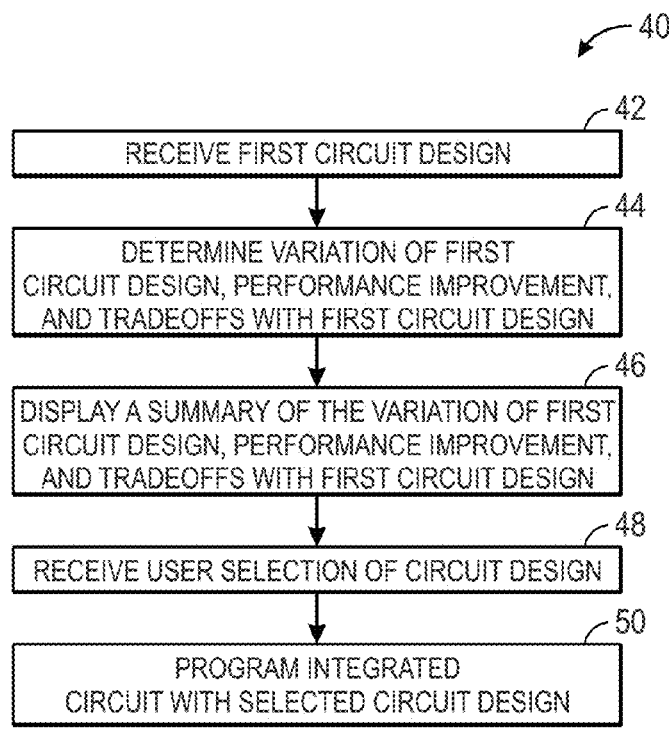
FIG. 2 illustrates a flow diagram of a process suitable for displaying and selecting variations of a first circuit design based on improved performance and tradeoffs using the system 10 of FIG. 1, in accordance with an embodiment.

FIG. 2 illustrates a flow diagram of a process 40 suitable for displaying and selecting variations (24, 26, 28) of a first circuit design 14 based on improved performance and tradeoffs using the system 10 of FIG. 1, in accordance with an embodiment. The process 40 may be implemented as computer instructions stored on one or more tangible, non-transitory machine-readable medias (memories) and executable by a processor. The process 40 may include receiving a first circuit design 14 (process block 42) at a retimer 20. The first circuit design 14 may be obtained from a memory included in the circuit design component 12, uploaded from another source, or retrieved from an external source (e.g., a server in a cloud environment).

The process 40 may also include determining one or more variations (e.g., 24, 26, 28) of the first circuit design 14, the performance improvement of the variations over the first circuit design 14, and tradeoffs with the first circuit design 14 (process block 44). As previously noted, the variations (e.g., 24, 26, 28) determined by the retimer 20 may include differing levels of speculative circuit design changes made to the first circuit design 14. For example, one level of speculative circuit design changes made in a variation to the first circuit design 14 may include only removing asynchronous clears, whereas another level of speculative circuit design changes may include removing asynchronous clears and adding pipelining (e.g., adding registers).

The retimer 20 may continue to generate variations of the first circuit design 14 until the maximum performance for a particular clock signal is obtained or the performance cannot be increased any further. In some embodiments, the number of variations determined may be limited (e.g., to some selectable number such as 5, 10, 15, or 20 variations), or the retimer 20 may stop determining variations after some time limit (e.g., a selectable time limit such as 500 milliseconds, 1 second, or 2 seconds). In some embodiments, the variations (e.g., 24, 26, and 28) may build off of one another by including the previous variation's speculative circuit design changes in the subsequent variation and incrementally speculating additional circuit design changes.

Also, the retimer 20 may retime the performance of the variation (e.g., 24, 26, 28) of the first circuit design 14 being fed each clock signal and determine the performance improvement for the variations being fed each clock signal over the performance of the first circuit design 14 being fed each clock signal. Additionally, the retimer 20 may determine the tradeoffs of each variation (e.g., 24, 26, 28) with the first circuit design 14. The term "tradeoffs" may refer to the achieved clock signal performance versus the level of effort required (e.g., number and type of speculative circuit design changes) to achieve that performance. In some instances, a point may be reached where additional circuit design changes (e.g., adding pipelining) may provide a marginal clock signal performance return and, therefore, may not be worth the added effort to implement in the circuit design.

Once determined, the GUI 16 may display a summary of the variations (24, 26, 28) of the first circuit design 14, performance improvement of the variations (24, 26, 28), and tradeoffs with the first circuit design 14 (process block 46). By enabling the user to see the tradeoffs between each level of variation to the first circuit design 14, the user may make a selection of which circuit design to implement based on the achieved clock signal performance of the circuit design and the amount of effort required to achieve that performance. That is, the GUI may include a user-selectable user interface element (e.g., a selectable table cell, a check box, a button) to enable selection of the desired circuit design. The GUI 16 may receive the user selection of the circuit design 32 (process block 48) and program the IC 18 with the selected circuit design (process block 50), which may include compiling the selected circuit design 30 using the compiler 32.

Figure 3:
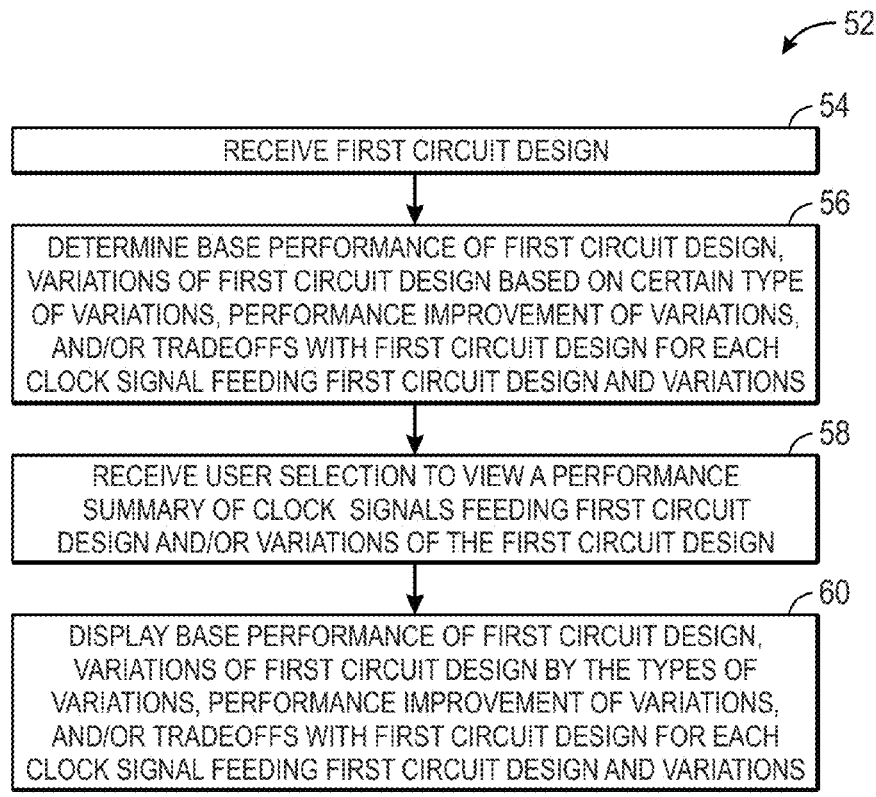
FIG. 3 illustrates a flow diagram of a process suitable for determining and displaying a performance summary of a first circuit design and variations of the first circuit design being fed clock signals, in accordance with an embodiment.

FIG. 3 illustrates a flow diagram of a process 52 suitable for determining and displaying a performance summary of clock signals feeding a first circuit design 14 and variations of the first circuit design 14, in accordance with an embodiment. The process 52 may be implemented as computer instructions stored on one or more tangible, non-transitory machine-readable medias (memories) and executable by a processor. The process 52 may include receiving the first circuit design 14 (process block 54) and determining a base performance of the first circuit design 14 and variations of the first circuit design 14 based on certain types of variations. The types of variations may be referred to as "hyper-retiming," "hyper-pipelining," and "hyper-optimization." Hyper-retiming may refer to speculative circuit design changes that include removing restrictions (e.g., asynchronous clears, user directives) without adding pipelining. A user directive may refer to registers that the user has indicated cannot be modified during retiming. However, hyper-retiming may estimate the performance gains obtainable if the user directives were removed. Further, asynchronous clears (e.g., reset signals) on registers included in the first circuit design 14 may be removed or converted to synchronous clears (e.g., reset signals).

Hyper-pipelining may refer to circuit design changes that include adding pipelining (e.g., adding registers) with or without removing restrictions (e.g., asynchronous clears, user directives). Pipelining may enable improving clock signal performance by allowing data to continue to flow around the restrictions without actually removing the restrictions. Hyper-optimization may refer to circuit design changes that involve more structural changes than can be performed by adding pipelining or removing restrictions using the register-transfer level (RTL). Hyper-optimization may provide recommendations to the underlying hardware included in a circuit design.

Process block 56 may also include determining the performance improvement of the variations and/or the tradeoffs with the first circuit design 14 for each clock signal feeding the first circuit design 14 and the variations. Then, the process 52 may include the GUI receiving a user's selection to view a performance summary of the clock signals feeding the first circuit design 14 and/or variations of the first circuit design 14 (process block 58). In response, the GUI may display the base performance of the first circuit design 14, variations of first circuit design 14 by the types of variations, the performance improvement of the variations, and/or tradeoffs with the first circuit design 14 for each clock signal feeding the first circuit design 14 and the variations (process block 60).

FIG. 4 illustrates a GUI screenshot 62 of the performance summary displayed by the process 52 of FIG. 3, in accordance with an embodiment. As illustrated, the screenshot 62 depicts a panel 64 displaying the performance of each clock signal feeding the first circuit design 14 and the variations of the first circuit design 14. For example, the panel includes a column for a name of the clock signal domain 66 (e.g., "clk_r" for clock read, "clk_w" for clock write), a maximum base performance achieved by the clock signal feeding the first design circuit 68 (e.g., "Fmax" for frequency maximum), a maximum performance achieved by the clock signal feeding variations using hyper-retiming speculative circuit design changes 70, a maximum performance achieved by the clock signal feeding variations using hyper-pipelining speculative circuit design changes 72, a maximum performance achieved by the clock signal feeding variations using hyper-optimization speculative circuit design changes 74, and a maximum frequency possible with the particular clock signal 76 (e.g. "restricted Fmax").

Using the panel 64, the user may visualize the achievable performance for each clock signal and the level of effort required to achieve that performance. For example, for clk_w, the panel shows that the Fmax 68 base performance of the first circuit design 14 is 255.04 MHz. However, using the performance results of the variations of the first circuit design 14 determined by the retimer 20, the panel shows that the achieved performance for clk_w using hyper-retiming speculative circuit design changes in the variations 70 is 416.32 MHz and the achieved performance for clk_w using hyper-pipelining speculative circuit design changes in the variations 72 is 541.71 MHz. Also, the panel suggests the user examine a report for recommendations for achievable performance using hyper-optimization 74.

Since the restricted Fmax 76 for clk_w is 541.71 MHz, the user may determine to select and/or perform the variations using hyper-pipelining speculative circuit design changes because they result in clock signal performance of 541.71 MHz (same as restricted Fmax). However, the user may not want to go to the level of effort of adding pipelining and may choose to select and/or perform the variations using hyper-retiming speculative circuit design changes if the clock signal performance generated (416.32 MHz) is sufficient for the user's needs. To make this decision, the user may want to see more details about the number and type of speculative circuit design changes for the variations of the first circuit design 14 that will be required to achieve the indicated clock signal performance.

Figure 5:
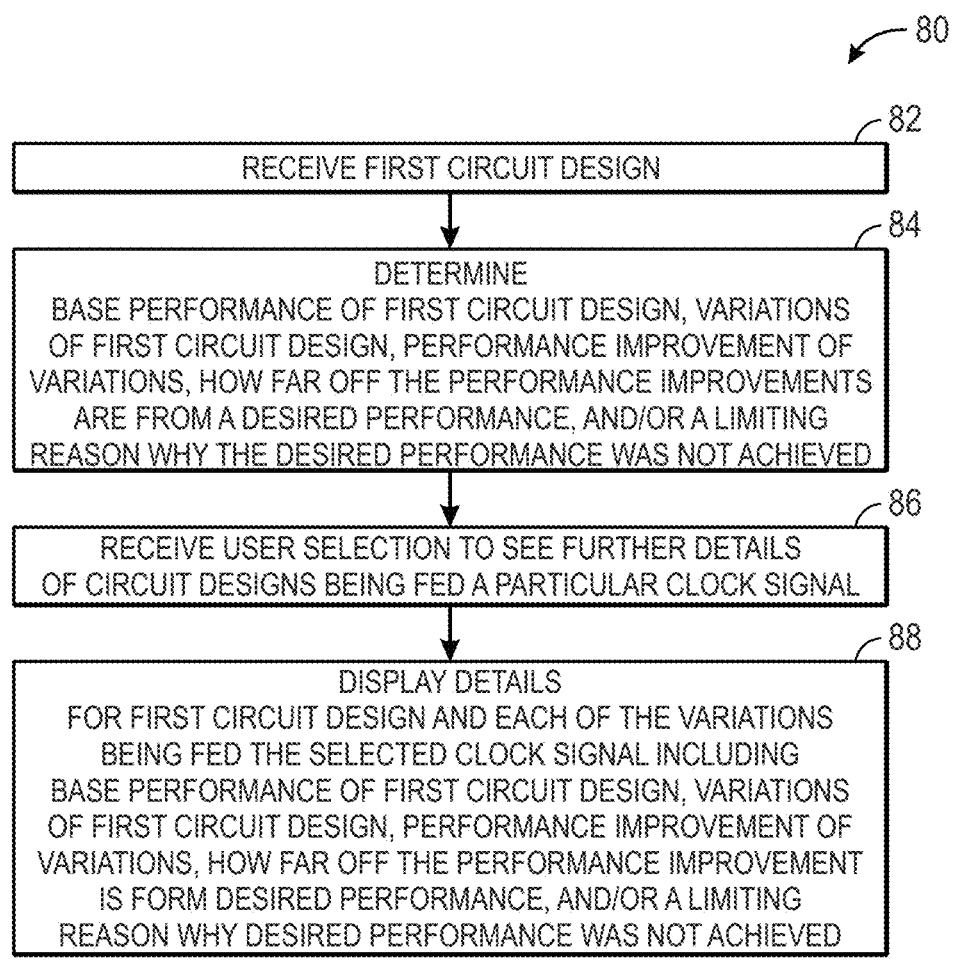
FIG. 5 illustrates a flow diagram of a process suitable for determining and displaying details of circuit designs being fed a particular clock signal, in accordance with an embodiment.

Accordingly, FIG. 5 illustrates a flow diagram of a process 80 suitable for determining and displaying details of circuit designs being fed a particular clock signal, in accordance with an embodiment. The process 80 may be implemented as computer instructions stored on one or more tangible, non-transitory machine-readable medias (memories) and executable by a processor. The process 80 may include receiving a first circuit design 14 (process block 82) and determining a base performance of the first circuit 14 design being fed a clock signal using a retimer 20 (process block 84). The retimer 20 may also determine variations of the first circuit design 14 (including speculative circuit design changes) (process block 84). The variations of the first circuit design 14 may include removing restrictions (e.g., user directives, asynchronous clears) and/or adding pipelining, as previously discussed. Once the variations are determined, the retimer 20 may retime the variation circuit designs to estimate clock signal performances and determine performance improvements of the variations being fed the clock signals over the base performance of the first circuit design 14 being fed the clock signals (process block 84).

Process block 84 may also include determining how much the performance improvements of the variations deviate from a desired performance of the clock signal (restricted Fmax) and/or a limiting reason why the desired performance of the respective variation being fed the clock signal was not achieved. It should be noted that the limiting reason why the desired performance of the respective variation being fed the clock signal was not achieved may be referred to as the "critical chain" herein. The critical chain may describe the dependencies/restrictions that prevented the retimer 20 from increasing the performance of a critical path in the circuit design. The critical path may refer to the data path in the circuit design that provides the longest delay in terms of time. Critical chains may have several categories, as described in detail below. For example, the critical chain categories may include insufficient registers available, a loop present that cannot be altered by adding registers because it would change behavior of the loop, a short path or a long path, and/or a path limit.

The user may make a selection to see further details of circuit designs (first circuit design 14 and/or variations of first circuit design 14) being fed a particular clock signal and the selection may be received by the GUI 16 (process block 86). As a result, the GUI 16 may display details for the first circuit design 14 and each variation of the first circuit design 14 being fed the selected clock signal including the base performance of the first circuit design 14, the variations of the first circuit design 14, performance improvement of the variations being fed the selected clock signal over the performance of the first circuit design 14 being fed the clock signal, how much the performance improvement of the first circuit design 14 and variations being fed the clock signal deviates from a desired performance (e.g., restricted Fmax), and/or the limiting reason why the desired performance for the first circuit design 14 and variations being fed the clock signal was not achieved (process block 88).

FIG. 6 illustrates a GUI 16 screenshot 90 of the details displayed by the process 80 of FIG. 5, in accordance with an embodiment. As depicted, the detail panel 92 displays details for clk_w clock signal domain, which the user may have selected from the summary depicted in the GUI 16 screenshot 62 of FIG. 4. The detail panel 92 may include a table 93 with columns for a variation (e.g., step) 94, speculative circuit design changes (e.g., optimizations) applied 96, the performance achieved by the respective circuit design (first circuit design 14 or variation of the first circuit design 14) 98, the amount the achieved performance deviates from a desired performance (referred to as "slack") 100, a target performance (frequency) in nanoseconds (referred to as "requirement") 102, and a limiting reason (critical chain) why the respective circuit design 104 being fed the clock signal did not meet the requirement.

As illustrated, the first row in the table 93 may include the base performance of the first circuit design 14 without any variations. Accordingly, the first row shows that there have been 0 speculative circuit design changes (e.g., optimizations) applied, including 0 pipeline stages added 96, which results in an achieved base performance of a maximum frequency (Fmax) of 255.04 MHz, a slack of −3.017 (negative because the achieved Fmax is below the target performance), a requirement of 0.874, and the limiting reason why the performance did not meet the requirement as being insufficient registers.

Each subsequent row (apart from the last row) displays the results from increasing the number and type of speculative circuit design changes included in the variations. In the illustrated embodiment, the additional rows just add additional pipelining and registers required for the pipelining, but the types of speculative circuit design changes and their order can be changed and/or directly controlled by the user. For example, the second row shows a first variation (step #1) of the first circuit design 14 that applies 381 speculative design changes (remove restrictions) and 0 pipeline stages. The first variation achieves an Fmax of 416.32 MHz, which is an improvement over the base performance but is still less than the requirement (slack of −1.498). The limiting reason according to the retimer 20 for the deviation is insufficient registers.

In the third row, another variation (step #2) of the first circuit design 14 applied more speculative design changes (439) to facilitate adding 1 pipeline stage, which achieves an Fmax of 531.91 MHz (still less than the requirement). As depicted, the variations in rows 4 and 5 (step #3 and step #4) add another pipeline stage, respectively, to the speculative circuit design changes. However, the improvement in clock signal performance is not substantial: the variation in row 4 (step #3) applied 439 speculative circuit design changes including 2 pipeline stages to achieve an Fmax of 538.79 MHz and the variation in row 5 (step #4) applied 439 speculative circuit design changes including 3 pipeline stages to achieve an Fmax of 541.71 MHz. In some embodiments, the last row of the table 93 may be a placeholder to indicate the potential for further improvements in performance for the particular clock signal with structural changes to the register-transfer level (RTL) (e.g., hyper-optimization).

As may be appreciated, using the GUI 16 may enable a user to analyze the tradeoffs for the number and type of speculative circuit design changes included in variations and the clock signal performance achieved. The user may determine that the marginal performance improvement between the variations may not be worth the number and type of circuit design changes required and select a variation that provides a sufficient level of performance with fewer circuit design changes required to implement on the IC. On the other hand, the user may determine that the level of effort required to achieve the maximum performance of the clock signal is satisfactory and select to implement that variation to the first circuit design 14.

Figure 7:
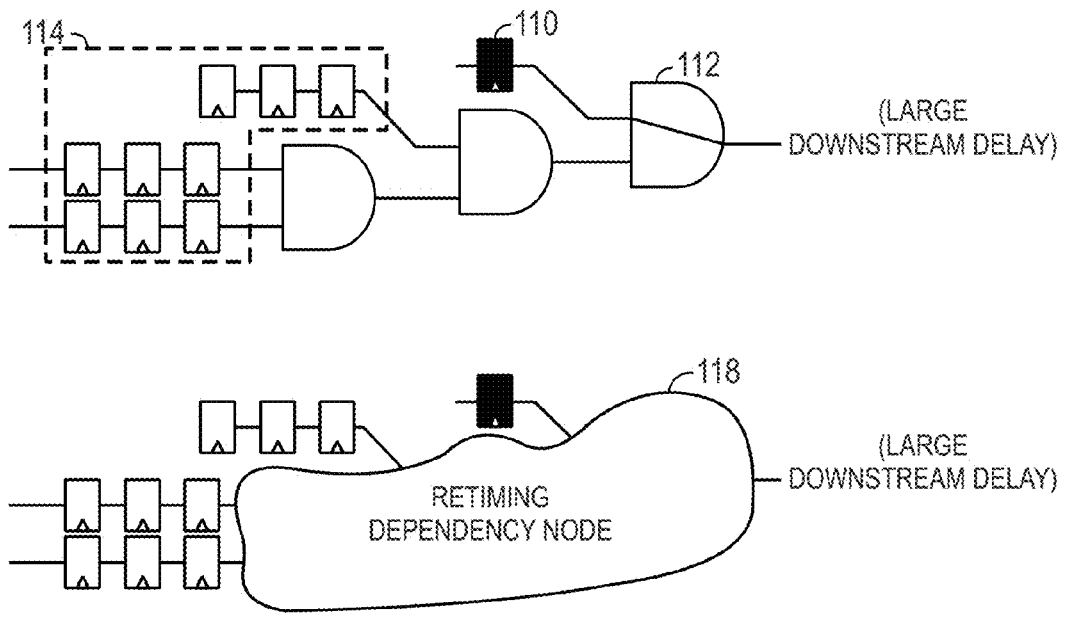
FIG. 7 illustrates a critical chain that limits the performance of a circuit design being fed a clock signal, in accordance with an embodiment.

As previously discussed, the retimer 20 may be prevented from improving the performance of certain circuit designs being fed clock signals due to one or more limiting reasons, referred to as the critical chain. Accordingly, FIG. 7 illustrates a critical chain that limits the performance of a circuit design being fed a clock signal, in accordance with an embodiment. In the illustrated embodiment, the path from the lower left register chain is the critical path. The retimer 20 may desire to move a register forward past AND gate 112, to shorten that path. However, to achieve that, the retimer 20 must move one register from each of the three 3-register chains (represented by dotted box 114), plus register 110, but, in this example, the retimer 20 cannot move the required registers because of a restriction on register 110 that prevents it from being moved. Thus, although the critical path is from the lower-left register to some downstream register, the critical chain includes register 110, since register 110 is what is restricting the retimer 20 from fixing the critical path. The critical chain may be represented as a retiming dependency node 118, which may be displayed to the user via the GUI 16, as described in detail below.

Figure 8:
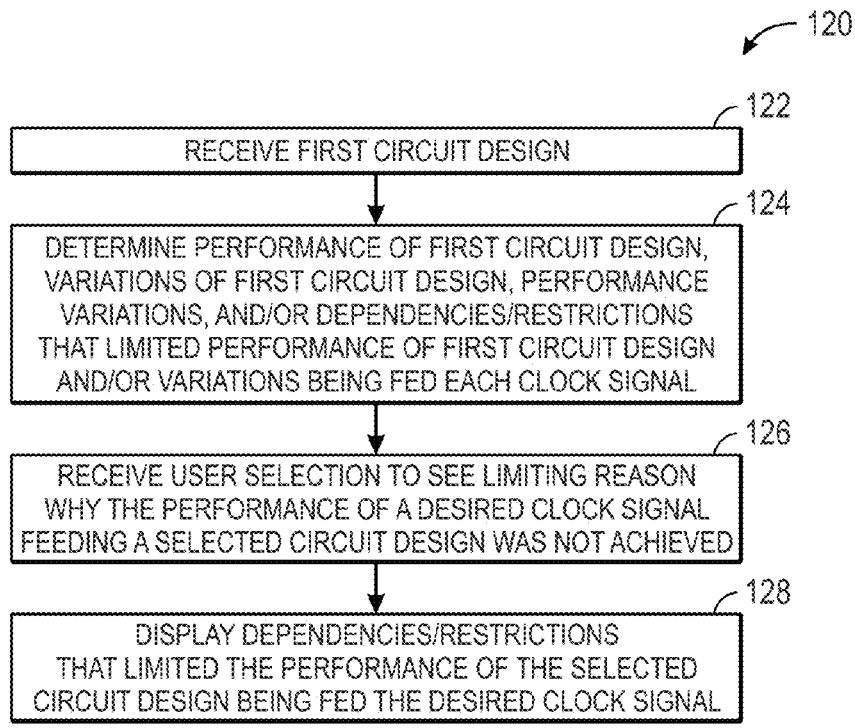
FIG. 8 illustrates a flow diagram of a process suitable for determining and displaying a limiting reason (e.g., critical chain) why a desired performance of a selected circuit design being fed a clock signal was not achieved, in accordance with an embodiment.

FIG. 8 illustrates a flow diagram of a process 120 suitable for determining and displaying a limiting reason (e.g., critical chain) why a desired performance of a selected circuit design being fed a clock signal was not achieved, in accordance with an embodiment. The process 120 may be implemented as computer instructions stored on one or more tangible, non-transitory machine-readable medias (memories) and executable by a processor. The process 120 may include receiving a first circuit design 14 (process block 122) and determining the performance of the first circuit design 14 being fed clock signals (process block 124). Process block 124 may also include determining variations of the first circuit design 14, the performance of the variations being fed the clock signals, and/or dependencies/restrictions that limited the performance (e.g., critical chain) of the first circuit design 14 and/or the variations being fed the clock signals.

The process 120 may further include receiving a user selection to view the limiting reason (e.g., critical chain) why the performance of a selected circuit design being fed a desired clock signal was not achieved (process block 126). The selected circuit design may include the first circuit design 14 or any one of the variations of the first circuit design 14 determined by the retimer 20. Then, the GUI 16 may display the critical chain including the dependencies/restrictions that limited the performance of the circuit design being fed the desired clock signal selected by the user (process block 128).

For example, FIG. 9 illustrates a GUI 16 screenshot 130 of the critical chain displayed by the process 120 of FIG. 8, in accordance with an embodiment. As illustrated, the screenshot 130 includes a panel 132 including a header 134, tabs 136, 138, and 140, and table 142 including columns 144, 146, 148, and 150. The panel 132 may be displayed as part of the screenshot 90 including the details panel 92 as a sub-panel or as a stand-alone panel on a separate GUI 16 page. The header 134 may include a description that the panel 132 includes information for the critical chain and recommendations for the selected circuit design to achieve the clock signal performance. The three tabs included in panel 132 may relate to the speculative circuit design changes applied (tab 136), the dependencies/restrictions included in the critical chain (tab 138), and the recommendations to overcome the dependencies/restrictions in the critical chain (tab 140).

As previously discussed, the user may have selected to drill-down on a particular circuit design presented in the screenshot 90 of FIG. 6 to view the dependencies/restrictions in the critical chain that limited the performance of the selected circuit design being fed the desired clock signal. In the depicted embodiment, the user selected the variation in row 2 (step #1) of the table 93 that applied 381 speculative circuit design changes including 0 pipeline stages and resulted in a clock signal performance of 416.32 MHz in FIG. 6, as shown in the header 134 of panel 132 in FIG. 9. Since the user chose to view the critical chain, tab 138 is highlighted and may include the table 142 with columns relating to path information (column 144), register (column 136), join (column 148), and element (column 150).

As illustrated, the table 142 displays the full set of dependencies/restrictions that prevented the retimer 20 from maximizing the performance of the selected variation being fed the clock signal. The limiting reason for the performance of the selected variation was insufficient registers as indicated the table 93 in FIG. 6. Accordingly, as shown, there is a retiming dependency between the register at endpoint #3 and the register at endpoint #2 which may be joined by a logic operator, such as an AND gate. The table 142 displays how the dependency between two paths is reflected in the GUI 16. Similar to FIG. 7, there is a critical long path that requires more registers, but in order to pull a register into that critical region it is required to move a register on a dependent path (the second, non-critical, long path). The logic that connects the two paths is the retiming dependency region, as shown in dotted box 152 illustrated in the table 142.

Figure 10:
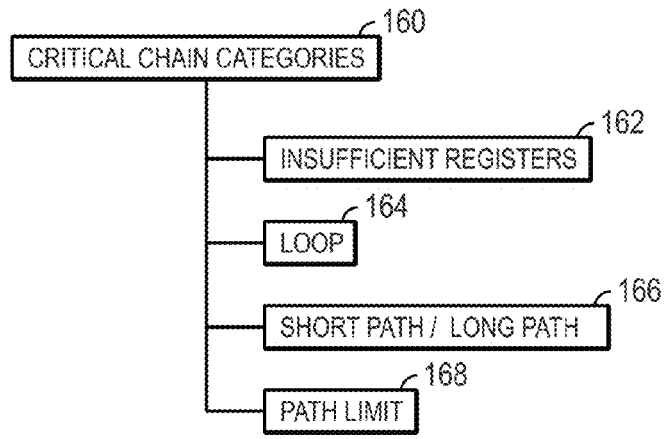
FIG. 10 illustrates a schematic diagram of critical chain categories, in accordance with an embodiment.

Critical chain categories 160 are illustrated in the schematic diagram of FIG. 10, in accordance with an embodiment. The critical chain categories 160 listed may include other retiming constraints that cannot be satisfied simultaneously and are not meant to be exclusive. A first critical chain category 162 may include insufficient registers, as previously discussed. Insufficient registers may indicate that additional registers need to be added to a particular path. For example, if there are two registers, each with a restriction, with a long path (from a time perspective) between them, the retimer 20 may determine that there are insufficient registers because the two registers cannot be moved due to the restrictions and there are no alternative registers to use to shorten the path (from a delay perspective).

A second critical chain category 164 may include a loop. That is, when there is a loop computation that is limiting the performance of a clock signal circuit design being fed a clock signal, and the retimer 20 cannot modify the loop because it may alter its functionality, then the retimer 20 may determine that the loop is causing the critical chain.

A third critical chain category 166 may include a short path/long path. A short path may refer to a lack of available locations to place registers. Each circuit design has fixed locations where registers can be placed. If the retimer 20 wants to move a register past some logic, the retimer 20 may have to move the register past path A and path B, but path B does not have any physical register locations available.

Thus, the retimer 20 may determine that path B is a short path because it has no available register locations. A long path may refer to a path that is long from a time perspective (long delay). If the retimer 20 determines that a particular path in the circuit design takes a long time to process the clock signal, then the retimer 20 may determine that the critical chain includes a long path limiting the clock signal performance.

A fourth critical chain category 168 may include a path limit. The path limit may indicate that there are no positions available for registers anywhere in the circuit design and the path limit has been reached. As a result, the retimer 20 may not be able to add pipelining (add registers) to enhance the performance of a clock signal feeding the circuit design. In such a case, the retimer 20 may determine that the critical chain includes a path limit.

Figure 11:
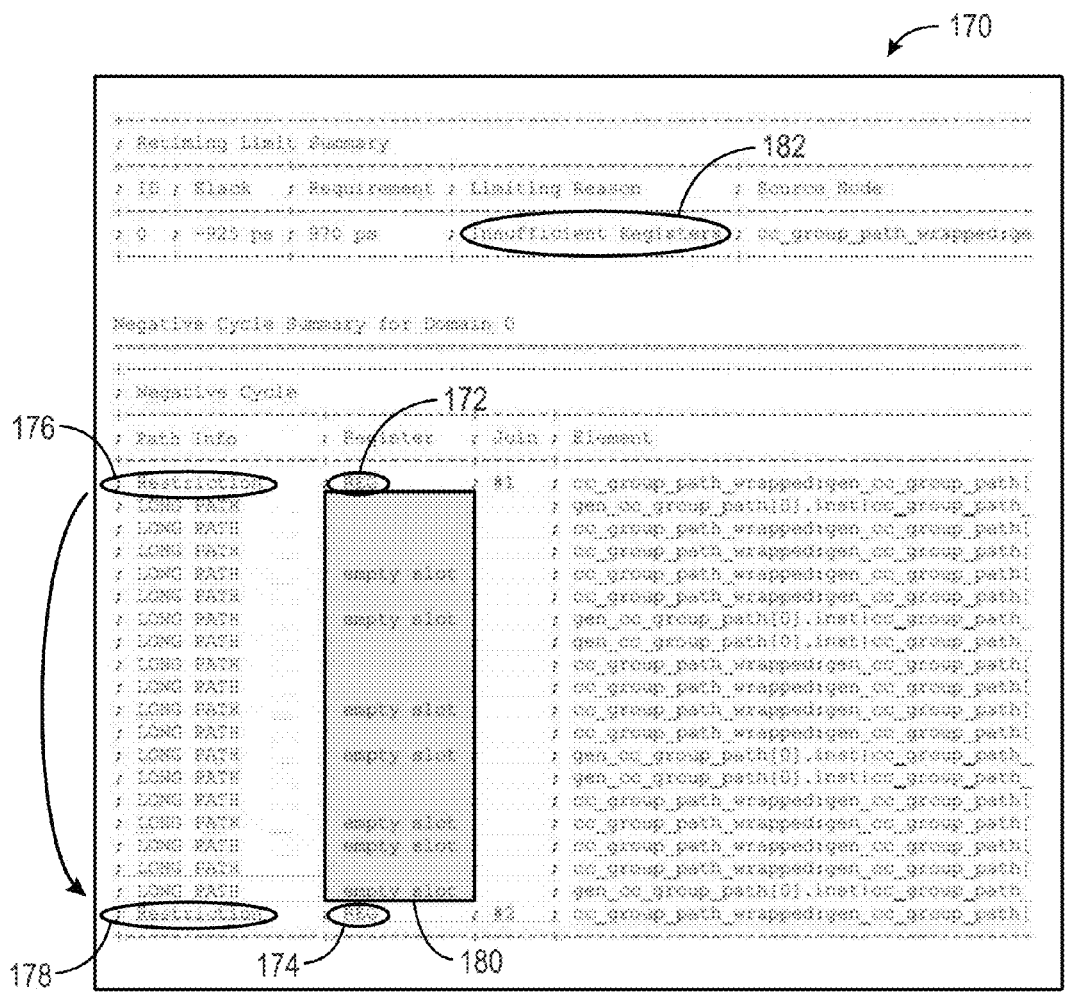
FIG. 11 illustrates a GUI screenshot showing a critical chain including insufficient registers, in accordance with an embodiment.

To further illustrate, FIG. 11 depicts a GUI 16 screenshot 170 showing another critical chain including insufficient registers, in accordance with an embodiment. In the depicted requirement register 172 at endpoint #1 and register 174 at endpoint #2 are separated by a long path between them, meaning the path between the registers 172 and 174 takes a long time to process the clock signal. Each register 172 and 174 includes a restriction (176 and 178). The path between the registers 172 and 174 may be referred to as a period constraint. A period constraint defines a path that is a constraint on the clock period (the reciprocal of the frequency) if a new register cannot be moved in between two endpoints. As a result, the retimer 20 cannot move the registers 172 and 174 to improve the performance of the circuit design being fed the clock signal. Instead, the retimer 20 wants to use additional registers to shorten the path but there are not available registers in the path, as shown by box 180. Thus, the retimer 20 determined that the critical chain includes insufficient registers as the limiting reason to the circuit design performance being fed the clock.

Figure 12A:
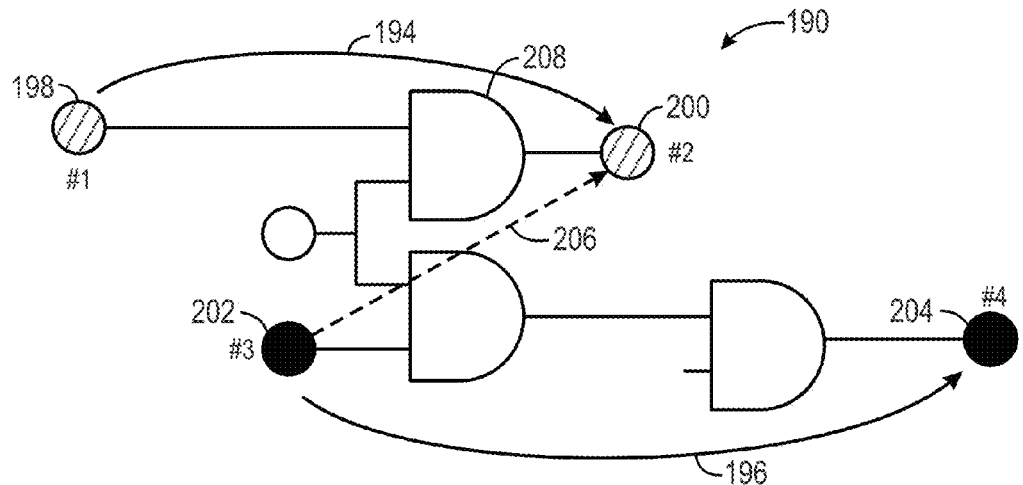
FIG. 12A illustrates a circuit diagram including registers and FIG. 12B illustrates a GUI screenshot showing the critical chain including insufficient registers for the circuit diagram of FIG. 12A.
Figure 12B:
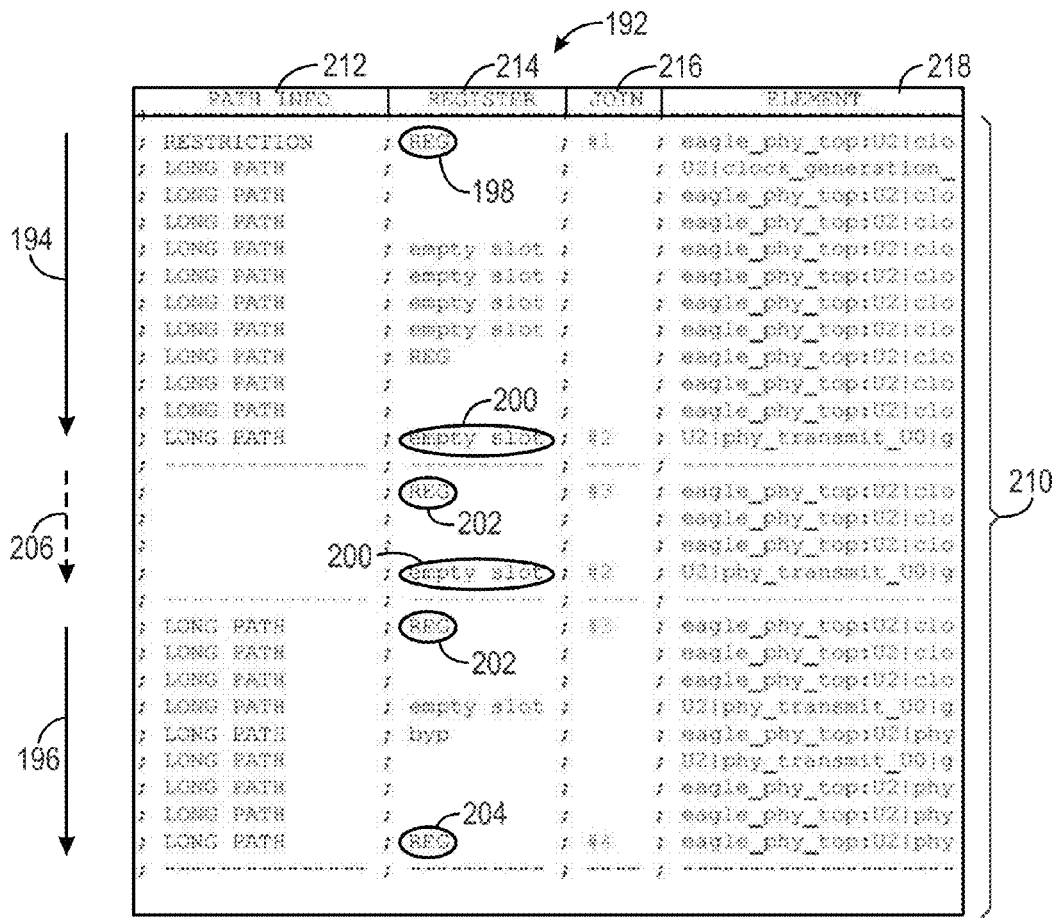

FIG. 12A illustrates a circuit diagram 190 including registers and FIG. 12B illustrates a GUI 16 screenshot 192 showing the critical chain including insufficient registers for the circuit diagram of FIG. 12A. Beginning with FIG. 12A, the circuit diagram 190 includes two period constraints (194 and 196). The first period constraint 194 is from register 198 (endpoint #1) to empty slot 200 (endpoint #2) and the second period constraint 196 is from register 204 (endpoint #3) to register 204 (endpoint #4). The path between the two period constraints 194 and 196 is shown by dashed arrow 206 and represents a retiming dependency node. Thus, the retiming dependency node includes the overlapping period constraints 194 and 196 because neither one of them can be optimized (e.g., retimed) without breaking the other.

For example, the retimer 20 may try to retime (improve performance of the circuit design) the path of the circuit design 190 from endpoint #3 to endpoint #4 but cannot do that without retiming from endpoint #1 to endpoint #2 because of the retiming dependency node. However, the retimer 20 cannot retime from endpoint #1 to endpoint #2 because the register 198 at endpoint #1 has a restriction on it. Likewise, if the retimer 20 attempts to retime the path from endpoint #1 to endpoint #2 by moving the register 198 at endpoint #1 to the empty slot 200 at endpoint #2 to advance the register past the logic (AND gate 208), then the retimer 20 would also have to move register 202 at endpoint #3 past the AND gate 208 because of the retiming dependency node. If the path included additional registers, then the retimer 20 may be able to improve the performance of the circuit design 190 being fed the clock signal. As a result, the retimer 20 may determine that there is a critical chain with insufficient registers limiting the circuit design performance.

The GUI 16 screenshot 192 in FIG. 12B may help the user visualize this scenario and see why retiming was not performed to improve the performance of the circuit design 190 being fed the clock signal. The GUI 16 screen shot 192 may include a table 210 with columns related to path information (column 212), register (column 192), join points (216), and element (column 218).

The table 210 depicts the first period constraint 194 from register 198 (endpoint #1) to empty slot 200 (endpoint #2), the path 206 between the two period constraints 194 and 196 that represents the retiming dependency node, and the second period constraint 196 from register 202 (endpoint #3) to register 204 (endpoint #4). As shown in the join points column 216, endpoint #1 is joined to endpoint #2, endpoint #3 is joined to endpoint #2, and endpoint #3 is joined to endpoint #4. Also, in the path info column 212, the table 210 displays that there is a restriction on the register 198 at endpoint #1. Thus, a user may determine from the table 210 that the long path from register 202 at endpoint #3 to register 204 at endpoint #4 (period constraint 196) cannot be retimed because that would require retiming the path between register 198 at endpoint #1 to empty slot 200 at endpoint #2 (period constraint 194) due to the dependency of register 202 at endpoint #3 on the empty slot 200 at endpoint #2 (path 206). However, period constraint 194 cannot be retimed due to the restriction on register 198 at endpoint #1. Thus, the user may see that the critical chain includes insufficient registers and may determine that additional pipelining stages may be used to improve the performance of the circuit design being fed the clock signal.

Figure 13:
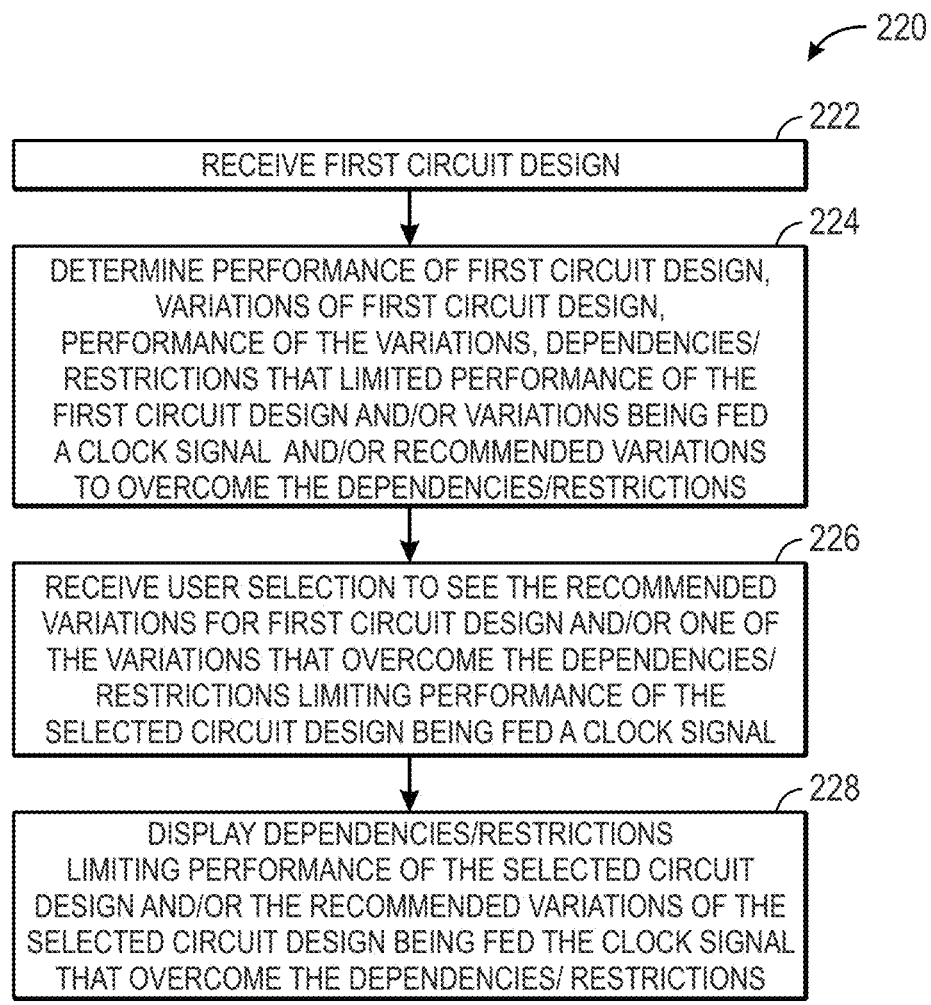
FIG. 13 illustrates a flow diagram of a process suitable for determining and displaying dependencies/restrictions limiting the performance of a selected circuit design being fed a clock signal and the recommended variations to the selected circuit design that overcome the dependencies/restrictions, in accordance with an embodiment.

In addition to displaying the details of the critical chain that is limiting performance of the circuit designs being fed the clock signals, the techniques may include providing recommended variations of the circuit designs to overcome the critical chain. As such, FIG. 13 illustrates a flow diagram of a process 220 suitable for determining and displaying dependencies/restrictions limiting the performance of a selected circuit design being fed a clock signal (critical chain) and the recommended variations that overcome the dependencies/restrictions, in accordance with an embodiment. The process 220 may be implemented as computer instructions stored on one or more tangible, non-transitory machine-readable medias (memories) and executable by a processor. The process 220 may include receiving a first circuit design 14 (process block 222) and determining the performance of the first circuit design 14 being fed clock signals (process block 224). Process block 224 may also include determining variations of the first circuit design 14, the performance of the variations, the dependencies/restrictions that limit performance of the first circuit design 14 and/or the variations being fed a clock signal, and/or additional recommended variations to overcome the dependencies/restrictions of a selected circuit design.

The process 220 may also include the GUI 16 receiving a user selection to see the additional recommended variations for the first circuit design 14 and/or one of the variations of the first circuit design 14 that overcome the dependencies/restrictions limiting the performance of the first circuit design 14 and/or the selected circuit design being fed a clock signal (process block 226). In response, the GUI 16 may display the dependencies/restrictions limiting performance of the selected circuit design being fed the clock signal and/or the recommended variations of the selected circuit design that overcome the dependencies/restrictions (process block 228).

Figure 14:
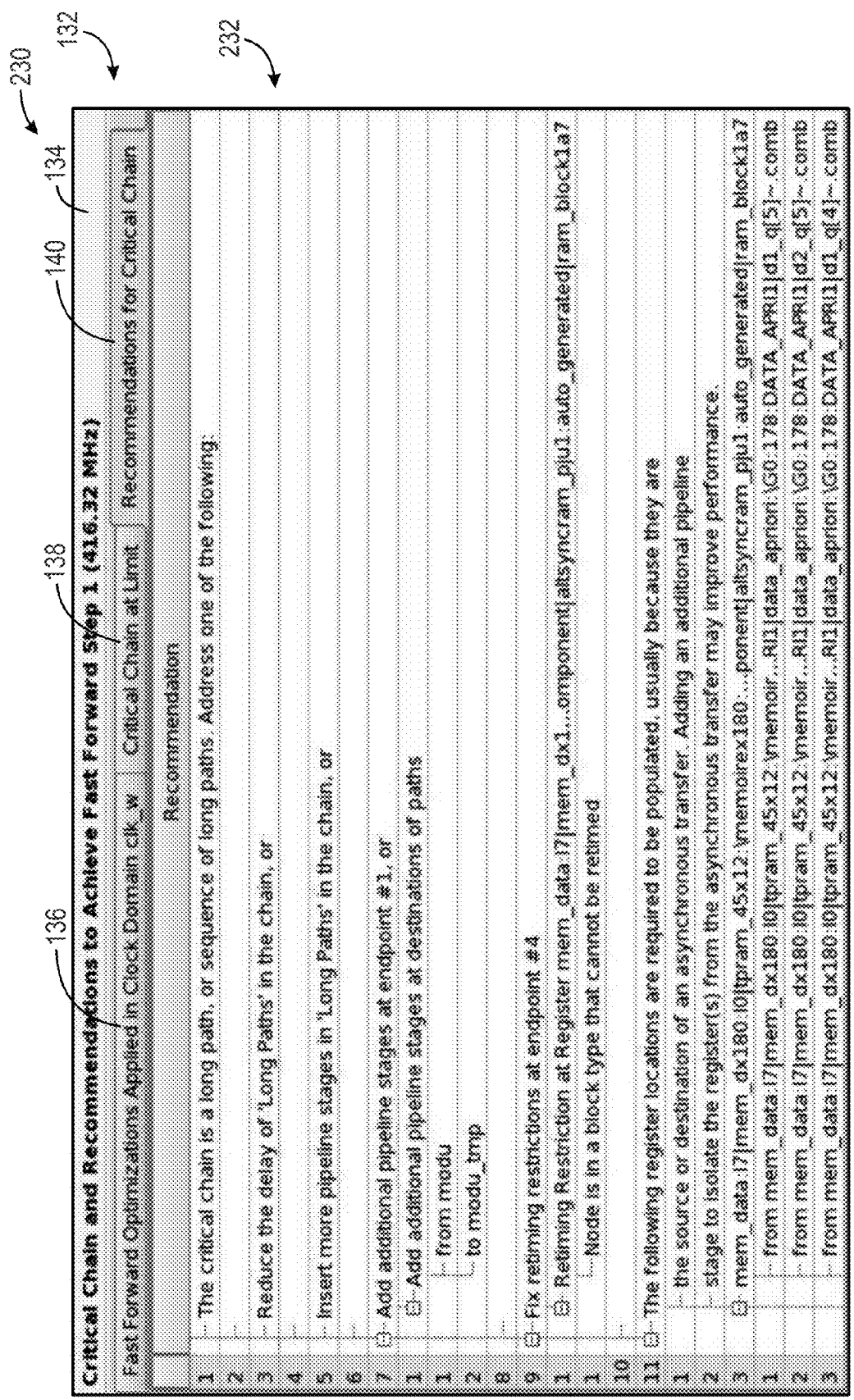
FIG. 14 illustrates a GUI screenshot of the dependencies/restrictions and the recommended variations to the selected circuit design determined by the process of FIG. 13, in accordance with an embodiment.

For example, FIG. 14 illustrates a GUI 16 screenshot 230 of the dependencies/restrictions included in a selected circuit design and the additional recommended variations determined by the process of FIG. 13, in accordance with an embodiment. As illustrated, the screenshot 230 includes a panel 132 including a header 134, tabs 136, 138, and 140, and table 142 including columns 144, 146, 148, and 150. The panel 132 may be displayed as part of the screenshot 90 including the details panel 92 in FIG. 6 as a sub-panel or as a stand-alone panel on a separate GUI 16 page. The header 134 may include a description that the panel 132 includes information for the critical chain and recommendations for the selected circuit design to achieve the clock signal performance. The three tabs included in panel 132 may relate to the speculative circuit design changes applied (tab 136), the dependencies/restrictions included in the critical chain (tab 138), and the recommendations to overcome the dependencies/restrictions in the critical chain (tab 140).

As previously discussed, the user may have selected to drill-down on a particular circuit design presented in the screenshot 90 of FIG. 6 to view the dependencies/restrictions in the critical chain that limited the performance of the selected circuit design being fed the desired clock signal. In the depicted embodiment, the user selected the variation in row 2 (step #1) of the table 93 that applied 381 speculative circuit design changes including 0 pipeline stages and resulted in a clock signal performance of 416.32 MHz in FIG. 6, as shown in the header 134 of panel 132 in FIG. 14. Since the user chose to view the recommendations to overcome the dependencies/restrictions in the critical chain, tab 140 is highlighted and may include a report 232 outlining the recommendations.

The report 232 in the illustrated embodiment indicates that the critical chain is a long path or is a sequence of long paths. The report then provides recommendations to overcome the critical chain's dependencies/restrictions. For example, the report recommends the user to reduce the delay of long paths in the critical chain, insert more pipeline stages in the long paths in the critical chain, add additional stages at endpoint #1, fix the retiming restriction at endpoint #4 (e.g., by removing a user directive or asynchronous clear). Also, the report 232 may identify register locations that are required to be populated, usually because they are the source or destination of an asynchronous transfer. The report 232 indicates that by adding an additional pipeline stage to isolate the registers may improve performance of the variation being fed the clock signal. As may be appreciated, the report 232 may be quite advantageous to a user by showing the user not only what aspects of the circuit design are limiting its performance, but also, describing recommended changes to the circuit design to make that may overcome the limiting dependencies/restrictions.

Figure 15:
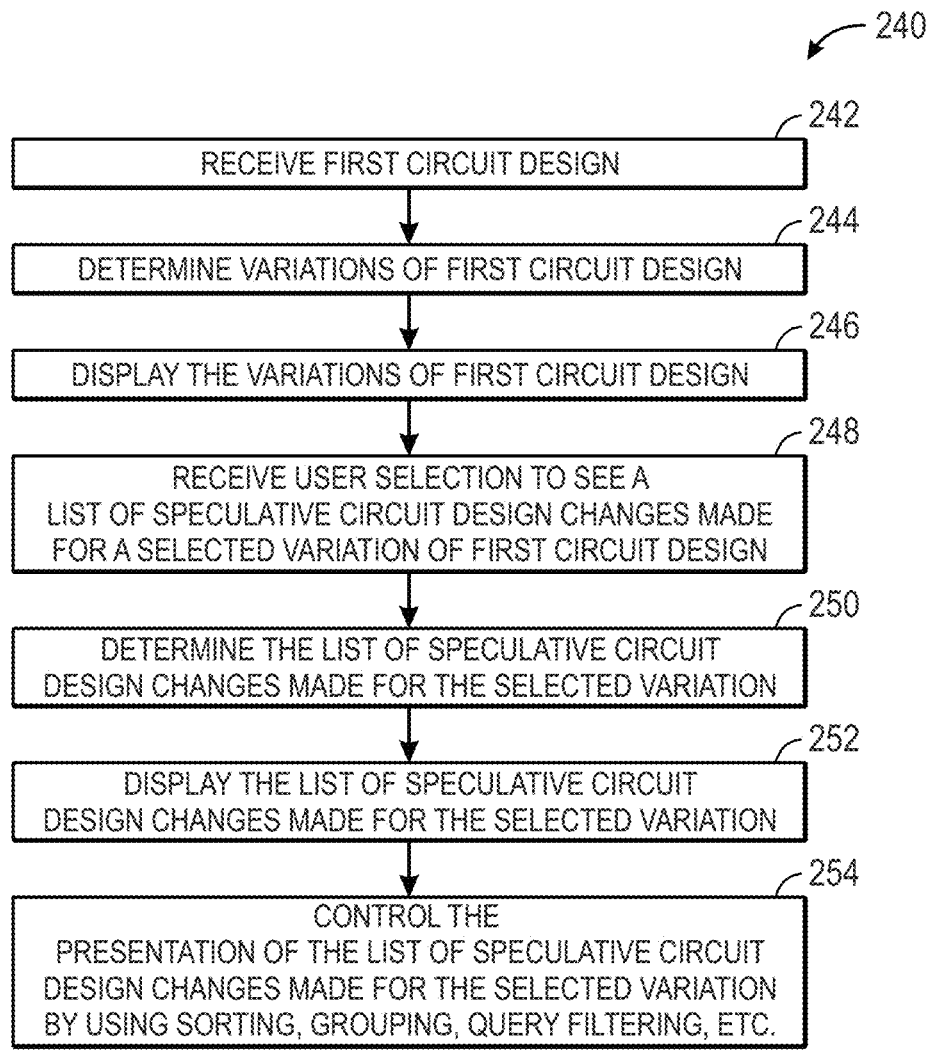
FIG. 15 illustrates a flow diagram of a process suitable for determining and displaying a list of speculative circuit design changes made for a selected variation of a first circuit design, in accordance with an embodiment.

A user may also desire to see the details of the speculative circuit design changes made to one or more of the variations of a first circuit design 14. Accordingly, FIG. 15 illustrates a flow diagram of a process 240 suitable for determining and displaying a list of speculative circuit design changes made for a selected variation of the first circuit design 14, in accordance with an embodiment. The process 220 may be implemented as computer instructions stored on one or more tangible, non-transitory machine-readable medias (memories) and executable by a processor. The process 240 may include receiving a first circuit design 14 (process block 242) determining variations of the first circuit design 14 (process block 244), and displaying the variations of the first circuit design 14 using the GUI 16 (process block 246).

The process 240 may also include receiving, via the GUI 16, a user selection to see a list of speculative circuit design changes made for a selected variation of the first circuit design 14 (process block 248). As such, process block 250 may include determining the list of speculative circuit design changes made for the selected variation. It should be noted that the order in which process block 248 and process block 250 occur can be switched, that is, determining the list (process block 250) may occur prior to receiving the user selection to see the list (process block 248). The GUI 16 may obtain the information for the list from the retimer 20. Then, the process 240 may include the GUI 16 displaying the list of speculative circuit design changes made for the selected variation (process block 252). Further, the process 240 may include controlling the presentation of the list of speculative circuit design changes made for the selected variation by using sorting, grouping, query filter, and the like. Indeed, the GUI 16 provides numerous controls to enable the user to modify the presentation of the information as desired.

FIG. 16 illustrates a GUI 16 screenshot 260 of a list of speculative circuit design changes made for a selected variation as determined by the process 240 of FIG. 15, in accordance with an embodiment. As illustrated, the screenshot 260 includes a panel 132 including a header 134 and tabs 136, 138, and 140. The panel 132 may be displayed as part of the screenshot 90 including the details panel 92 in FIG. 6 as a sub-panel or as a stand-alone panel on a separate GUI 16 page. The header 134 may include a description that the panel 132 includes information for the critical chain and recommendations to the selected circuit design to achieve the clock signal performance. The three tabs included in panel 132 may relate to the speculative circuit design changes applied (tab 136), the dependencies/restrictions included in the critical chain (tab 138), and the recommendations to overcome the dependencies/restrictions in the critical chain (tab 140).

In the illustrated embodiment, the user may have selected to drill-down on a particular circuit design presented in the detail panel 92 of screenshot 90 of FIG. 6 to view the list of speculative circuit design changes made for a variation of the first circuit design 14. In the depicted embodiment, the user selected the variation in row 2 (step #1) of the table 93 in FIG. 6 that applied 381 speculative circuit design changes including 0 pipeline stages and resulted in a clock signal performance of 416.32 MHz, as shown in the header 134 of panel 132 in FIG. 16. Since the user chose to view the list of speculative circuit design changes made for a variation of the first circuit design 14, tab 136 is highlighted and may include a report 262 presenting the list of speculative circuit design changes.

The list of speculative circuit design changes shown in the report 262 may include removing asynchronous clears, converting asynchronous clears to synchronous clears, removing user directives, adding pipelining stages, and so forth. As depicted, the list is sorted by the type of speculative circuit design (e.g., remove asynchronous clear, add pipelining, user directive), clock signal domain (e.g., clock write), entity, and instance, and is grouped by bus. Each level of the report 262 may be expandable and collapsible to enable efficient viewing. In some embodiments, this sorting and grouping organization may be the default setting in the GUI 16.

It should be appreciated that there can be tens of thousands of speculative circuit design changes made by the retimer 20. In those situations, it may be beneficial to provide the user with controls to modify the presentation of the information as desired. Accordingly, the GUI 16 may include controls for sorting, grouping, filtering, and the like, which are illustrated in FIGS. 17-22. It should be understood that the information presented by the GUI 16 may be sorted, grouped, and/or filtered in any desirable manner.

Figure 17:
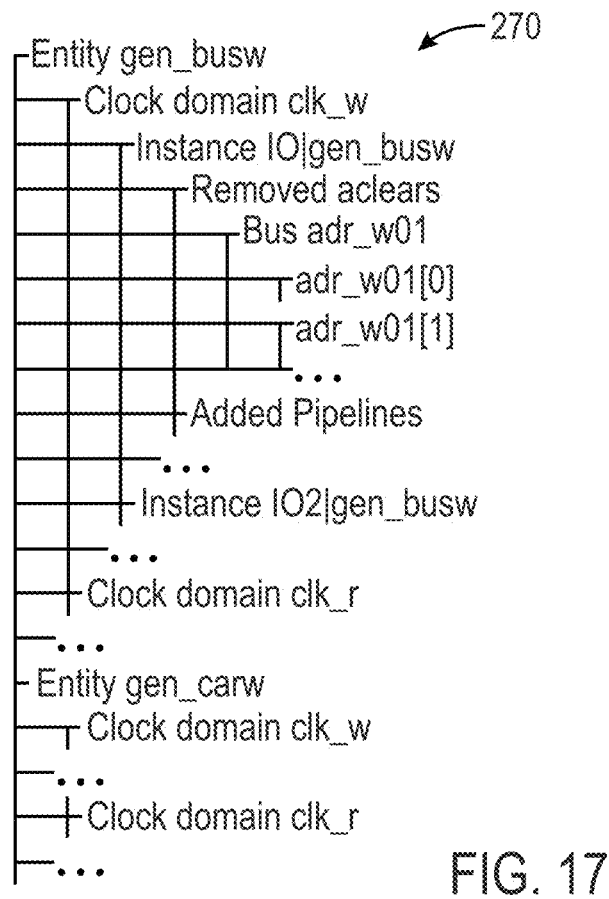
FIG. 17 illustrates speculative circuit design changes made for a variation to a first circuit design displayed by the GUI in a report sorted by entity, clock signal domain, instance, variation type, and bus, in accordance with an embodiment.
Figure 18:
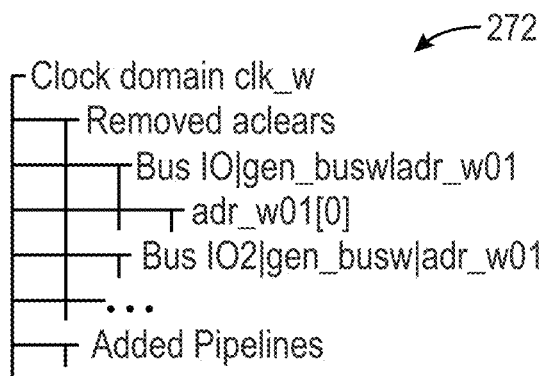
FIG. 18 illustrates speculative circuit design changes made for a variation to a first circuit design displayed by the GUI in a report sorted by clock signal domain and variation type, in accordance with an embodiment.
Figure 19:
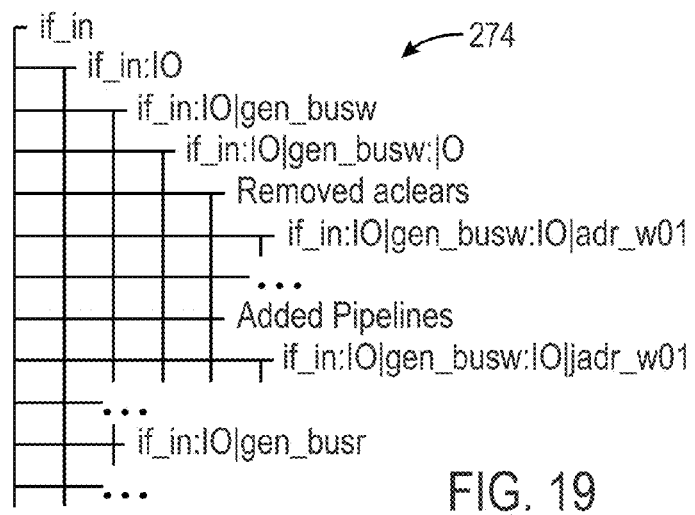
FIG. 19 illustrates speculative circuit design changes made for a variation to a first circuit design displayed by the GUI in a report sorted by hierarchy, in accordance with an embodiment.

For example, starting with FIG. 17, speculative circuit design changes made in a variation to a first circuit design 14 may be displayed by the GUI 16 in a report 270 sorted by entity, clock signal domain, instance, type of speculative circuit design, and grouped by bus, in accordance with an embodiment. In some scenarios, the user may desire to see the speculative circuit design changes in a report 272 sorted by clock signal domain and speculative circuit design change and grouped by bus, as illustrated in FIG. 18. Additionally or alternatively, the user may desire to view the speculative circuit design changes made for a variation to a first circuit design 14 in a report 274 sorted by hierarchy instead of entity or instance, as illustrated in FIG. 19. Such a presentation of the information may enable the user to view all of the speculative circuit design changes at any level, so that collapsing a level of the hierarchy presents all the speculative circuit design changes at that level.

Figure 20:
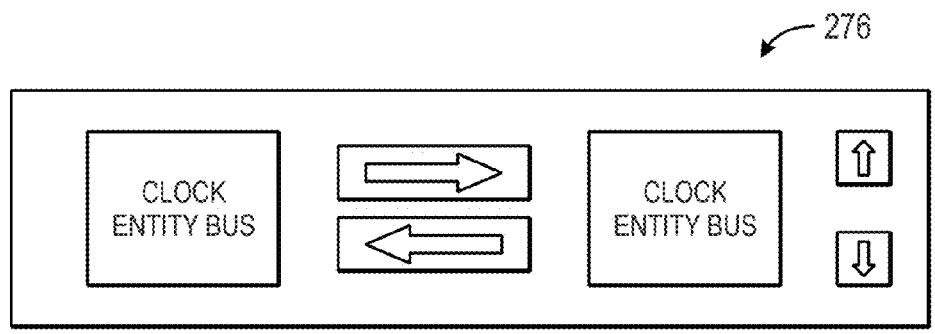
FIG. 20 illustrates a grouping control used by the GUI, in accordance with an embodiment.
Figure 21:
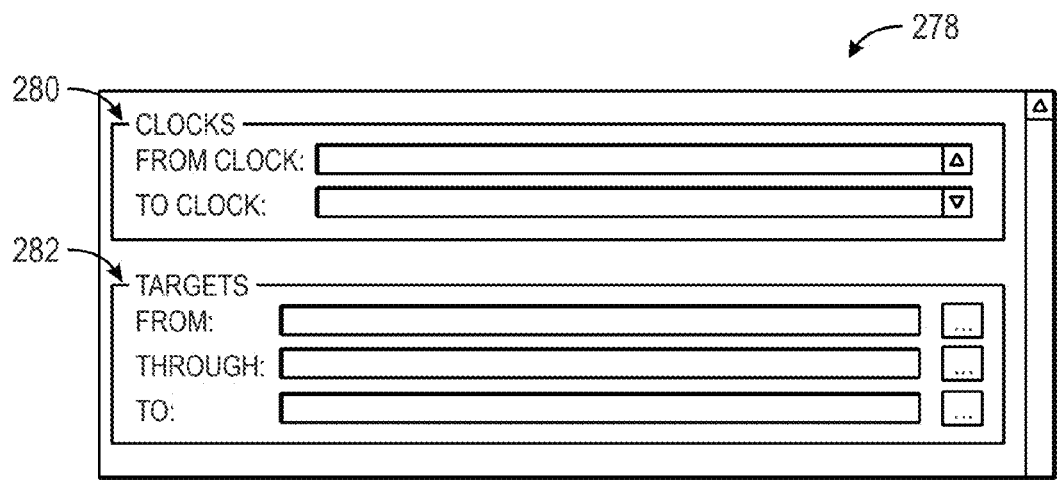
FIG. 21 illustrates a filtering control used by the GUI, in accordance with an embodiment.

In some embodiments, the GUI 16 may include controls for enabling grouping selections. For example, FIG. 20 illustrates a grouping control 276 used by the GUI 16, in accordance with an embodiment. As illustrated, the grouping control 276 may include an ordered-set selector where the user may choose which fields to group and in which order. The fields the user may select from may include the clock signal domain, type of speculative circuit design change, instance, entity, and/or bus. It should be noted, that in some embodiments, the GUI 16 may enable grouping using a text-based query. For example, the user could enter the following text-based query in a command prompt in the GUI 16:
report_recommendations  –group_by  clock,  entity, instance In some embodiments, the GUI 16 may include a control for filtering the information presented. For example, FIG. 21 illustrates a filtering control 278 used by the GUI 16, in accordance with an embodiment. The filtering control 278 may include various input components, such as text boxes, drop-down boxes, radio buttons, and so forth, that enable the user to select which fields to filter (e.g., clock signal domain, type of speculative circuit design change, entity, instance bus). In the depicted filtering control 278, the user may select desired clocks 280, such as a "from clock" (e.g., clock read) and the "to clock" (e.g., clock write), and choose targets 282 (e.g., registers) in between the selected clock signals to filter for the report. Additionally or alternatively, the GUI 16 may provide a text-based command prompt where the user can type in desired filtering commands. For example, the user can enter a command for the GUI 16 to display a report with all asynchronous clear speculative circuit design changes for registers fed by clock read (clk_r) that have names with "bus" in them:
report_recommendations –aclear –to_clock clk_r –to *bus*

In another example, the user may enter a command for the GUI 16 to display a report with all pipelining speculative circuit design changes for transfers from clock read (clk_r) to clock write (clk_w):
report_recommendations –pipeline –from_clock clk_r –to_clock clk_w In another example, the user may enter a command for the GUI 16 to display a report with all asynchronous clear speculative circuit design changes for all registers with "car" in their name:
report_recommendations –aclear –to *car*

Figure 22:
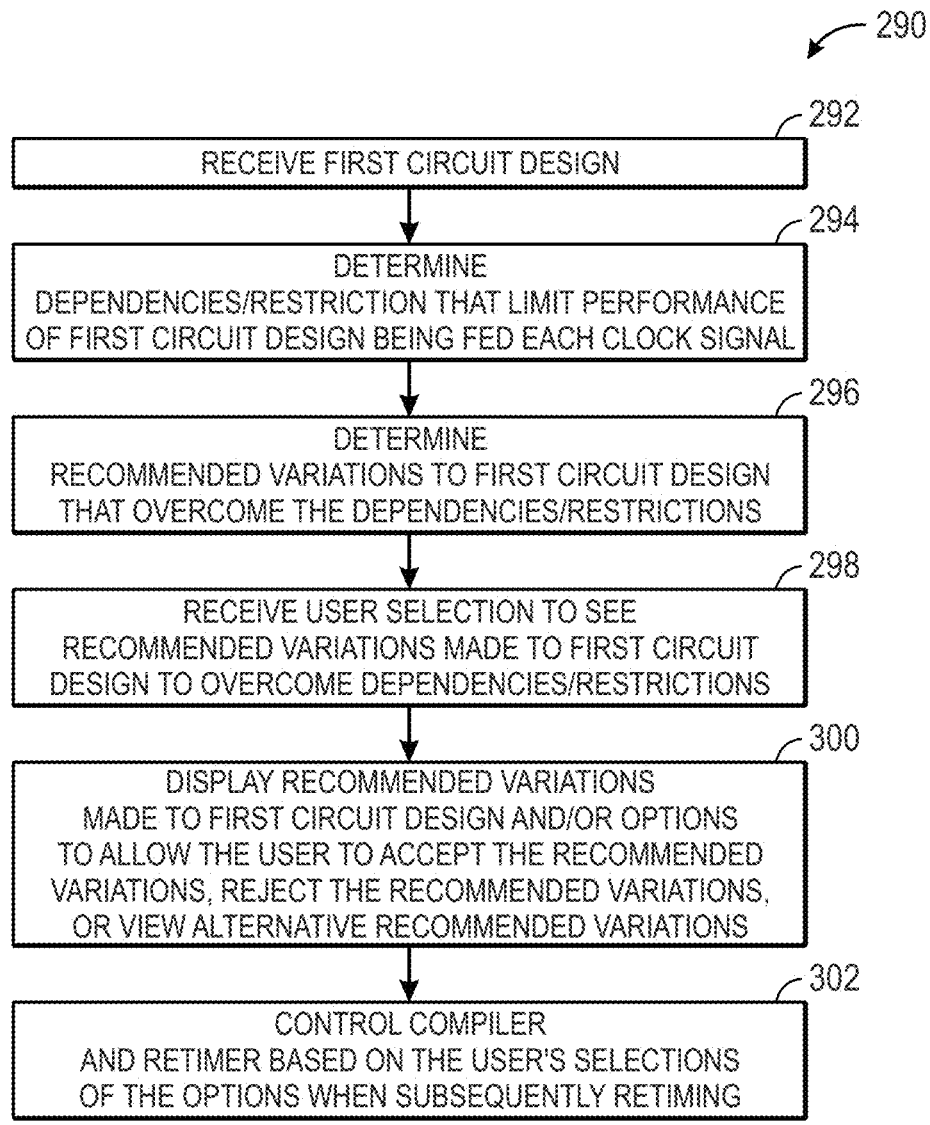
FIG. 22 illustrates a flow diagram of a process suitable for controlling which variations the retimer can recommend for the first circuit design when performing subsequent retiming and compilation, in accordance with an embodiment.

It should be appreciated, that the user may enter a command that includes combined filtering and grouping:
report_recommendations –aclear –to *car* –group_by clock, entity, instance FIG. 22 illustrates a flow diagram of a process 290 suitable for controlling which variations the retimer 20 can recommend for the first circuit design 14 when performing subsequent retiming and compilation, in accordance with an embodiment. Using process 290, the user may guide future retiming and compilation behavior by accepting a recommended variation, rejecting a recommended variation, or requesting to view alternative recommended variations. By accepting a specific recommended variation, the optimizations performed by the compiler and speculative circuit design changes made by the retimer 20 for future variations may be affected. For example, an accepted recommended variation may preempt the retimer 20 from making other variations when subsequently retiming. Further, if the user accepts a specific recommended variation, the compiler may ascertain how the affected registers can be moved, and can accurately determine which paths are potentially more critical than others. Also, the compiler may implement the circuit design changes that the user actually intends to make so the retimer 20 can estimate the performance of the circuit design with those changes. By rejecting a specific recommended variation, the speculative circuit design changes made by the retimer 20 for future variations may be affected (e.g., by preventing the retimer 20 from speculatively making a specific circuit design change).

The process 290 may be implemented as computer instructions stored on one or more tangible, non-transitory machine-readable medias (memories) and executable by a processor. The process 290 may include receiving a first circuit design 14 (process block 292), determining dependencies/restrictions that limit performance of the first circuit design 14 being fed each clock signal (process block 294), and determining recommended variations to the first circuit design 14 that overcome the dependencies/restrictions (process block 296). Then, the process 290 may include receiving a user selection to see the recommended variations made to the first circuit design 14 to overcome the dependencies/restrictions (process block 298). In response, the GUI 16 may display the recommended variations made to the first circuit design 14 and/or options to allow the user to accept the recommended variations, reject the recommended variations, or view alternative recommended variations (process block 300). Based on the user's selections of the options, the process 290 may include controlling the compiler and retimer 20 when subsequently retiming (process block 302), as discussed above.

Figures 23, 24:
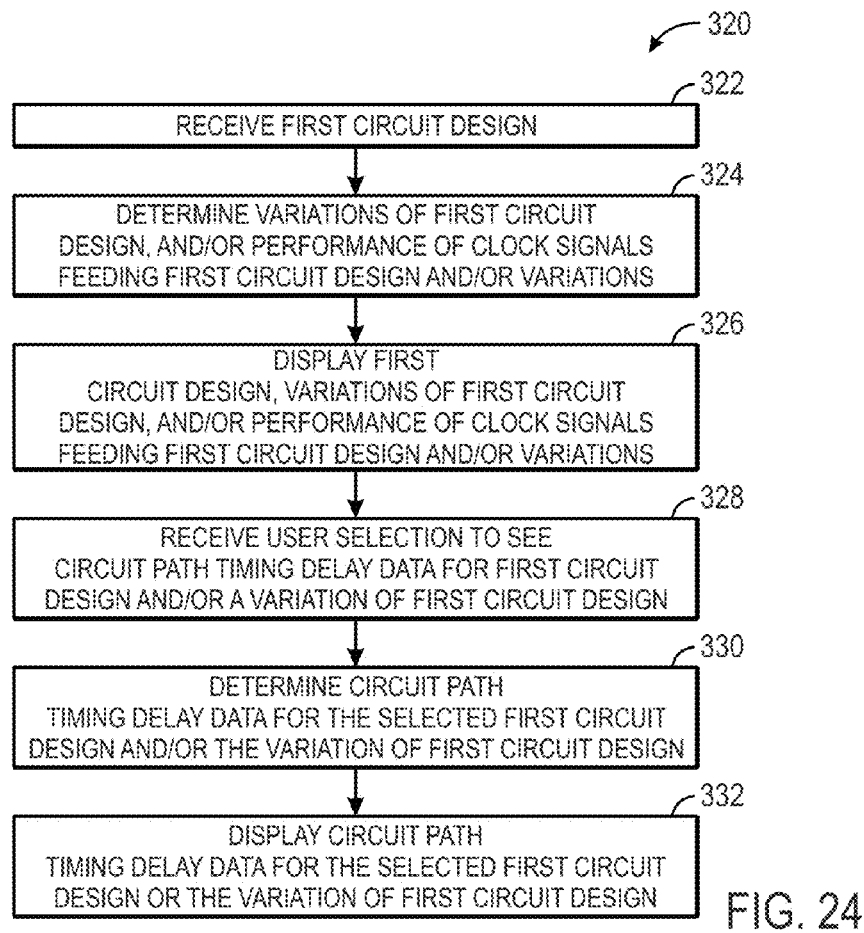
FIG. 23 illustrates a GUI screenshot for controlling the behavior of the retimer and compiler using options related to recommended variations displayed by the process of FIG. 22, in accordance with an embodiment.
FIG. 24 illustrates a flow diagram of a process suitable for determining and displaying netlists including timing delay data of data paths in a first circuit design and/or variations of the first circuit design, in accordance with an embodiment.

FIG. 23 illustrates a GUI 16 screenshot 304 for controlling the behavior of the retimer 20 and compiler using options related to recommended variations displayed by the process of FIG. 22, in accordance with an embodiment. As illustrated, the screenshot 304 includes a panel 306 which may be a sub-panel of another panel presented by the GUI 16 or may be a standalone panel on its own GUI 16 page. The panel 306 may include a header 308 and a critical chain tab 310 and a data path tab 312. In the depicted embodiment, the user has selected the data path tab 312, which is highlighted. The contents of the data path tab 312 may include at least a section related to the recommended registers to insert into a clock domain 314 and a section related to recommended registers to modify in a clock domain 316.

As depicted, the specific clock domain being analyzed in the screenshot 304 is the set host clock ("set_host_clk"). In the section 314 related to inserting registers, the GUI 16 may recommend how many register are needed to be inserted into the various paths of the circuit design. For example, as depicted, the GUI 16 recommends inserts up to two registers on thirty-two paths between the set clock ("set_clk") and the set host clock ("set_host_clk"). The GUI 16 also provides the recommended registers to add at specific locations and presents the user with options 318 to accept the recommendation, reject the recommendation ("never suggest this recommendation"), or view alternative recommendations.

If the user accepts the recommendation, the compiler may make similar optimizations in the future before retiming occurs and the retimer 20 may continue to make and recommend similar speculative circuit design changes. If the user rejects the recommendation, then the retimer 20 may not make similar speculative circuit design changes in the future. In the section 316 related to recommended registers to modify in a specific clock domain, the GUI 16 may recommend the changes to make to the registers to improve the performance of the circuit design. In some instances, the recommendations may include removing user directives, removing asynchronous clears, converting asynchronous clears to synchronous clears, and so forth. The GUI 16 may present the user with the same options 318 to accept, reject or view alternative recommendations, and the behavior of the compiler and retimer 20 may be controlled based on the user's selections. For example, in some cases the retimer 20 may recommend removing user directives on certain registers. However, the user may not want to remove the specified user directives and reject the recommendation on the GUI 16, which will prevent the retimer 20 from removing user directives on those registers when subsequently retiming and from recommending that the user directives on those registers be removed when subsequently retiming.

FIG. 24 illustrates a flow diagram of a process 320 suitable for determining and displaying netlists including circuit path timing delay data, in accordance with an embodiment. A netlist may refer to the connectivity of a circuit design. The "net" may refer to the data paths that are connected to form the circuit. The netlist may list the data paths, including timing information for each data path (e.g., delay data) and the registers involved with each data path, instances, and so forth. The process 320 may be implemented as computer instructions stored on one or more tangible, non-transitory machine-readable medias (memories) and executable by a processor.

The process 320 may include receiving a first circuit design 14 (process block 322), determining variations of the first circuit design 14 and/or performance of the first circuit design 14 and/or variations being fed the clock signals using the retimer 20 (process block 324), and displaying the first circuit design 14, variations of the first circuit design 14, and/or performance of first circuit design 14 and/or the variations being fed the clock signals using the GUI 16 (process block 326). In process block 328 the GUI 16 may receive a user selection to see the netlists including timing delay data for the data paths in the first circuit design 14 and/or the variations (process block 328). The timing delay data may refer to the time it took the clock signal to process through a data path. The path that took the longest amount of time (referred to as the longest path) determines the maximum frequency (Fmax) of the clock signal feeding the circuit design. Thus, it may be beneficial to enable the user to see the various netlists including timing delays of each data path in the circuit design to determine which data paths to make circuit design changes to improve the performance of the circuit design being fed the clock signals.

In response to receiving the user selection (process block 328), the process 320 may include determining the netlist including the timing delay data for the data paths in the first circuit design 14 and/or the variations (process block 330) and displaying the netlist including the timing delay data for the selected first circuit design 14 and/or the variation of the first circuit design 14 (process block 332).

For example, FIG. 25 illustrates a GUI 16 screenshot 334 of netlists including the timing delay data of the data paths in selected circuit designs determined by the process of FIG. 24, in accordance with an embodiment. As illustrated, the screenshot 334 includes the detail panel 92 from FIG. 6 which displays the first circuit design 14, variations of the first circuit design 14, improved performance of clock the variations being fed the clock signals over the first circuit design 14, and the tradeoffs (number and type of speculative circuit design changes versus improved performance of the clock signal) of the variations with the first circuit design 14. The base performance achieved by the first circuit design 14 is 425.89 MHz, the performance of the first variation is 687.76 MHz applying 1152 speculative circuit design changes and 1 pipeline stage added, and the improved performance of the second variation is 811.03 MHz applying 1152 speculative circuit design changes and 2 pipeline stages added.

To see the netlists including the timing delay data of the data paths in the first circuit design 14 and the variations, the user can select the particular circuit design's performance and another panel may be displayed. For example, selecting the performance of the first circuit design 14 may cause its netlist to be displayed in panel 336, selecting the performance of the first variation may cause its netlist to be displayed in panel 338, and selecting the performance of the second variation may cause its netlist to be displayed in panel 340. It should be understood that the netlists may be accessed via any suitable manner, such as clicking a button included in the circuit design's row to show its netlist, selecting a different parameter in the row, and so forth. It should be noted that, in some embodiments, the panel may be a sub-panel of another panel presented by the GUI 16 (e.g., panel 92 of FIG. 6) or may be a standalone panel on its own GUI 16 page (e.g. pop-up panel). Using the netlist, the user can see the specific timing information and delay data for each data path in the selected circuit design, as previously discussed.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

What is claimed is:

1. A tangible, non-transitory, computer-readable medium, comprising instructions that, when executed by a processor, cause the processor to:
   receive a first circuit design;
   determine one or more variations of the first circuit design using register retiming with speculative circuit design changes to the first circuit design;

determine one or more performance improvements of the one or more variations when fed one or more clock signals over the first circuit design;

determine one or more tradeoffs of the one or more variations of the first circuit design in comparison to the first circuit design, wherein the tradeoffs comprise a number or a type of the speculative circuit design changes made in the one or more variations to achieve the respective performance improvements, or both;

display a summary of the one or more variations of the first circuit design, the one or more performance improvements, and the one or more tradeoffs;

provide a user-selectable user interface element to enable selection of the first circuit design, at least one of the one or more variations of the first circuit design, or a combination thereof;

receive a user selection of a circuit design from the first circuit design or the one or more variations; and output the selected circuit design to facilitate programming an integrated circuit.

2. The tangible, non-transitory, computer-readable medium of claim 1, wherein the tradeoffs comprise the number and the type of the speculative circuit design changes made in the one or more variations to achieve the respective performance improvements.

3. The tangible, non-transitory, computer-readable medium of claim 1, wherein the summary displays the one or more variations by type of variation comprising removing restrictions, adding pipelining, hardware modifications, or some combination thereof.

4. The tangible, non-transitory, computer-readable medium of claim 1, wherein the one or more variations comprise speculative circuit design changes comprising removing a restriction on a register, adding a stage of pipelining, or some combination thereof.

5. The tangible, non-transitory, computer-readable medium of claim 1, comprising instructions to:

display how much the performance improvement of the one or more variations when fed the one or more clock signals deviates from a desired performance for the one or more variations and a limiting reason why the desired performance was not achieved by the first circuit design and the one or more variations.

6. The tangible, non-transitory, computer-readable medium of claim 5, wherein the limiting reason comprises insufficient registers in a data path, a loop that cannot be modified, a data path that takes a long time to process the one or more clock signals, a data path that has no available register locations, or meeting a limit of available register positions in the circuit design.

7. The tangible, non-transitory, computer-readable medium of claim 1, comprising instructions to:

determine a critical chain including a limiting reason why performance of a selected circuit design being fed a clock signal did not meet a desired performance and recommended variations to the selected circuit design to overcome the critical chain; and display the critical chain including the limiting reason why the performance of the selected circuit design being fed the clock signal did not meet the desired performance and the recommended variations to the selected circuit design to overcome the critical chain.

8. The tangible, non-transitory, computer-readable medium of claim 7, comprising instructions to:

display options comprising accepting the recommended variations and rejecting the recommended variations; and control subsequent compilations and variations of the first circuit design based on user selection of the options.

9. The tangible, non-transitory, computer-readable medium of claim 1, comprising instructions to:

display netlists including timing delay data of data paths in the first circuit design, the one or more variations, or some combination thereof.

10. The tangible, non-transitory, computer-readable medium of claim 9, comprising instructions to:

organize the speculative design changes using grouping, sorting, filtering, or some combination thereof, with criteria related to a type of speculative circuit design change made in the one or more variations, a clock signal domain, an entity, an instance, a bus, or some combination thereof.

11. A computer-implemented method, comprising:

receiving, via a retimer, a first circuit design;

determining, using the retimer, a plurality of variations of the first circuit design including speculative circuit design changes by at least performing register retiming;

determining performances of the first circuit design and the plurality of variations when fed clock signals;

determining tradeoffs of the plurality of variations in comparison to the first circuit design, wherein the tradeoffs comprise a number or a type of the speculative circuit design changes made in the plurality of variations to achieve the respective performances, or both;

displaying, using a graphical user interface (GUI), a summary of the plurality of variations of the first circuit design including speculative circuit design changes, the performances, and the tradeoffs;

receiving, via the GUI, user selection of the first circuit design, at least one of the plurality of variations, or some combination thereof; and outputting the selected circuit design to facilitate programming an integrated circuit.

12. The method of claim 11, comprising displaying the summary with rows for each clock signal and columns for the first circuit design and the plurality of variations, the performance of the first circuit design and the plurality of variations, and the maximum frequency achievable by each respective clock signal, wherein the columns for the performances of the plurality of variations are organized by type of variation performed.

13. The method of claim 12, wherein the type of variation comprises hyper-retiming, hyper-pipelining, hyper-optimization, or some combination thereof.

14. The method of claim 11, wherein the plurality of variations comprise different amounts and different types of speculative circuit design changes that achieve different levels of performances of the plurality of variations being fed the clock signals, which are represented by the tradeoffs.

15. The method of claim 11, comprising controlling the retimer and a compiler when determining the plurality of variations based on user selection of options comprising accepting recommended speculative circuit design changes, rejecting recommended speculative circuit design changes, or some combination thereof.

16. The method of claim 11, comprising:

determining, using the retimer, a critical chain of the first circuit design, the plurality of variations, or some combination thereof, including a limiting reason why the performance of the first circuit design, the plurality of variations, or some combination thereof, being fed clock signals did not meet a maximum performance for the clock signals, and recommended variations to overcome the critical chain; and displaying, using the GUI, the critical chain of the first circuit design, the plurality of variations, or some combination thereof, including the limiting reason why the performance of the first circuit design, the plurality of variations, or some combination thereof, being fed the clock signals did not meet the maximum performance for the clock signals, and the recommended variations to overcome the critical chain.

17. A circuit design component executed in a processor, comprising:
a retimer configured to:
receive a first circuit design;
determine a plurality of variations of the first circuit design including speculative circuit design changes by at least performing register retiming;
determine performances of the first circuit design and the plurality of variations when fed clock signals; and
determine tradeoffs of the plurality of variations in comparison to the first circuit design, wherein the tradeoffs comprise a number or a type of the speculative circuit design changes made in the plurality of variations to achieve the respective performances, or both; and
a graphical user interface (GUI) configured to:
display a summary of the plurality of variations of the first circuit design including speculative circuit design changes, the performances, and the tradeoffs;
receive user selection of the first circuit design, at least one of the plurality of variations of the first circuit design, or a combination thereof; and
output the selected circuit design to facilitate programming an integrated circuit.

18. The circuit design component of claim 17, wherein the tradeoffs comprise the number and the type of the speculative circuit design changes made in the plurality of variations to achieve the respective performances.

19. The circuit design component of claim 17, wherein the GUI is configured to control how the retimer determines subsequent variations based on whether the user accepts or rejects the plurality of variations.

* * * * *